US012598611B2

(12) United States Patent
Ding et al.

(10) Patent No.: US 12,598,611 B2
(45) Date of Patent: Apr. 7, 2026

(54) INFORMATION SENDING METHOD AND APPARATUS, AND INFORMATION RECEIVING METHOD AND APPARATUS

(71) Applicant: HUAWEI TECHNOLOGIES CO., LTD., Shenzhen (CN)

(72) Inventors: Yang Ding, Shenzhen (CN); Jinhuan Xia, Beijing (CN); Tong Su, Shenzhen (CN); Lei Guan, Beijing (CN)

(73) Assignee: Huawei Technologies Co., LTD.

( * ) Notice: Subject to any disclaimer, the term of this patent is extended or adjusted under 35 U.S.C. 154(b) by 413 days.

(21) Appl. No.: 18/477,277

(22) Filed: Sep. 28, 2023

(65) Prior Publication Data

US 2024/0023107 A1 Jan. 18, 2024

Related U.S. Application Data

(63) Continuation of application No. PCT/CN2022/083222, filed on Mar. 26, 2022.

(30) Foreign Application Priority Data

Apr. 1, 2021 (CN) .......................... 202110358812.3

(51) Int. Cl.
*H04W 72/02* (2009.01)
*H04L 1/1812* (2023.01)
(Continued)

(52) U.S. Cl.
CPC ........... *H04W 72/21* (2023.01); *H04L 1/1812* (2013.01); *H04W 72/56* (2023.01)

(58) Field of Classification Search
CPC . H04W 72/02; H04W 72/04; H04W 72/0446; H04W 72/21; H04W 72/23;
(Continued)

(56) References Cited

U.S. PATENT DOCUMENTS

2020/0106566 A1    4/2020   Yeo et al.
2020/0196302 A1    6/2020   Takeda et al.
(Continued)

FOREIGN PATENT DOCUMENTS

CN        110771073 A      2/2020
CN        111262668 A      6/2020
(Continued)

OTHER PUBLICATIONS

International Search Report and Written Opinion in International Appln. No. PCT/CN2022/083222, mailed on May 19, 2022, 19 pages (with English translation).
(Continued)

*Primary Examiner* — Bo Hui A Zhu
(74) *Attorney, Agent, or Firm* — Fish & Richardson P.C.

(57) ABSTRACT

Example methods and apparatuses are described. An example method includes: receiving first physical uplink control channel (PUCCH) configuration information corresponding to a first service and second PUCCH configuration information corresponding a second service, and respectively indicate a granularity of a first time unit and a granularity of a second time unit; determining first hybrid automatic repeat request (HARQ) information and second HARQ information, where a priority of the first HARQ information is the same as a priority of the second HARQ information; and in response to determining that the granularity of the first time unit is different from the granularity of the second time unit, feeding back the first HARQ information in the first time unit and the second HARQ information in the second time unit, wherein the first time unit and the second time unit do not overlap in time domain.

20 Claims, 14 Drawing Sheets

(51) Int. Cl.
*H04W 72/21*          (2023.01)
*H04W 72/56*          (2023.01)

(58) Field of Classification Search
CPC ..... H04W 72/50; H04W 72/51; H04W 72/52; H04W 72/53; H04W 72/54; H04W 72/541; H04W 72/542; H04W 72/543; H04W 72/56
See application file for complete search history.

(56)          References Cited

U.S. PATENT DOCUMENTS

| | | | |
|---|---|---|---|
| 2020/0229211 A1 | 7/2020 | Hosseini et al. | |
| 2021/0051704 A1 | 2/2021 | Yang et al. | |
| 2022/0124767 A1* | 4/2022 | Fu ......................... | H04W 72/23 |
| 2022/0183032 A1* | 6/2022 | Papasakellariou .... | H04L 1/1861 |
| 2023/0147173 A1* | 5/2023 | Matsumura ........... | H04W 72/23 |
| | | | 370/329 |

FOREIGN PATENT DOCUMENTS

| | | |
|---|---|---|
| CN | 111756506 A | 10/2020 |
| CN | 111757518 A | 10/2020 |
| CN | 111800864 A | 10/2020 |
| CN | 112398614 A | 2/2021 |
| WO | 2020066025 A1 | 4/2020 |
| WO | 2020199856 A1 | 10/2020 |
| WO | 2021031995 A1 | 2/2021 |
| WO | 2022154528 A1 | 7/2022 |

OTHER PUBLICATIONS

CMCC, "Remaining issues on scheduling and HARQ," 3GPP TSG RAN WG1 #100, R1-2000752, e-Meeting, Feb. 24-Mar. 6, 2020, 5 pages.

Moderator (Huawei), "FL summary#5 on improving reliability for MBS for RRC_CONNECTED UEs," 3GPP TSG RAN WG1 #104-e, R1-2102134, E-meeting, Jan. 25-Feb. 5, 2021, 53 pages.

Moderator (OPPO), "Summary#1 of email thread [104-e-NR-L1enh-URLLC-02]," 3GPP TSG RAN WG1 #104-e, R1-2101841, e-Meeting, Jan. 25-Feb. 5, 2021, 27 pages.

Extended European Search Report in European Appln No. 22778817.1, dated Jul. 15, 2024, 13 pages.

Office Action in Japanese Appln. No. 2023-560360, mailed on Dec. 3, 2024, 8 pages (with English Translation).

Huawei et al., "Mechanisms to improve reliability for RRC_CONNECTED UEs," 3GPP TSG RAN WG1 Meeting #104-e, R1-2100190, E-meeting, Jan. 25-Feb. 5, 2021, 6 pages.

Intel Corporation, "Mechanisms to Improve Reliability of NR-MBS for RRC_CONNECTED UEs," 33GPP TSG RAN WG1 #104-e, R1-2100675, e-Meeting, Jan. 25-Feb. 5, 2021, 8 pages.

Moderator (Huawei), "FL summary#1 on improving reliability for MBS for RRC_CONNECTED UEs," 33GPP TSG RAN WG1 Meeting #104-e, R1-200xxxx, E-meeting, Jan. 25-Feb. 5, 2021, 37 pages.

Moderator (Huawei), "FL summary#1 on improving reliability for MBS for RRC_CONNECTED UEs," 3GPP tsg_ran\wg1_rl1, E-meeting, Jan. 25-Feb. 5, 2021, 37 pages.

3GPP TS 38.213 V16.5.0, "3rd Generation Partnership Project; Technical Specification Group Radio Access Network; NR; Physical layer procedures for control (Release 16)," Mar. 2021, 183 pages.

\* cited by examiner

PDSCH: physical downlink shared channel     DL: downlink     Slot: slot

PUCCH: physical uplink control channel     UL: uplink $K_1$: $K_1$ indicates a minimum quantity of slots between the PDSCH and the PUCCH DL: downlink                    Slot/Subslot:slot/subslot UL: uplink                      A/N: acknowledgment/negative acknowledgment PDSCH: physical downlink shared channel    PUCCH-config #1: PUCCH configuration #1

PUCCH: physical uplink control channel     PUCCH-config #2: PUCCH configuration #2

(a)

(b)

1800

1900

INFORMATION SENDING METHOD AND APPARATUS, AND INFORMATION RECEIVING METHOD AND APPARATUS

CROSS-REFERENCE TO RELATED APPLICATIONS

This application is a continuation of International Application No. PCT/CN2022/083222, filed on Mar. 26, 2022, which claims priority to Chinese Patent Application No. 202110358812.3, filed on Apr. 1, 2021. The disclosures of the aforementioned applications are hereby incorporated by reference in their entireties.

TECHNICAL FIELD

This application relates to the field of communication technologies, and in particular, to an information sending method and apparatus, and an information receiving method and apparatus.

BACKGROUND

A hybrid automatic repeat request (hybrid automatic repeat request, HARQ) is an efficient transmission mechanism. Reliability of downlink data transmission can be greatly improved through retransmission. After receiving data information sent by a network device, a terminal device needs to feed back a HARQ acknowledgment (acknowledgement, ACK) or negative acknowledgment (negative acknowledgment, NACK) to the network device. The network device performs retransmission only when the terminal device feeds back the negative acknowledgment (negative acknowledgment, NACK) to the network device. This reduces overall resource consumption of data transmission. At present, a mechanism of feeding back a plurality of pieces of HARQ information in a same uplink slot is supported. To be specific, the terminal device can simultaneously feed back a plurality of pieces of HARQ information to the network device in a same uplink slot, so that the network device determines whether the terminal device correctly receives data that is sent through a plurality of pieces of semi-persistent scheduling (semi-persistent scheduling, SPS) or downlink control information (downlink control information, DCI) scheduling. Therefore, when the plurality of pieces of HARQ information are fed back simultaneously, a combination sorting manner of the HARQ information needs to be defined, and combined HARQ information may be referred to as a HARQ acknowledgment (HARQ-ACK) codebook. The terminal device may further determine, based on a size of the codebook, physical uplink control channel (physical uplink control channel, PUCCH) resources to be used for transmission that are configured in physical uplink control channel configuration (physical uplink control channel config, PUCCH-config) information in higher layer signaling.

However, when the network device configures both a multicast PUCCH-config and a unicast PUCCH-config for the terminal device, and multicast data and unicast data have a same priority, how the terminal device sends, when a conflict occurs between a resource indicated by multicast configuration information and a resource indicated by unicast configuration information, HARQ information corresponding to unicast and HARQ information corresponding to multicast is a technical problem being resolved by persons skilled in the art.

SUMMARY

Embodiments of this application disclose an information sending method and apparatus, and an information receiving method and apparatus, to resolve a problem of how to send, when a conflict occurs between a resource indicated by multicast configuration information and a resource indicated by unicast configuration information, HARQ information corresponding to unicast and HARQ information corresponding to multicast, and improve feedback reliability of HARQ information.

A first aspect of embodiments of this application discloses an information sending method, including: receiving first physical uplink control channel PUCCH configuration information and second PUCCH configuration information from a network device, where the first PUCCH configuration information corresponds to a first service, the second PUCCH configuration information corresponds to a second service, the first PUCCH configuration information indicates a granularity of a first time unit, the second PUCCH configuration information indicates a granularity of a second time unit, and the granularity of the first time unit is different from the granularity of the second time unit; determining first hybrid automatic repeat request HARQ information and second HARQ information, where the first HARQ information is feedback information of data of the first service, the second HARQ information is feedback information of data of the second service, and a priority of the first HARQ information is the same as a priority of the second HARQ information; and if the first time unit overlaps the second time unit, sending one of the first HARQ information and the second HARQ information to the network device, and discarding the other one; or if the first time unit overlaps the second time unit, concatenating the first HARQ information and the second HARQ information, and sending, to the network device, HARQ information that is obtained through concatenation and that includes the first HARQ information and the second HARQ information, where the first service is one of unicast and multicast, and the second service is the other one of unicast and multicast.

In the foregoing method, when the network device configures two pieces of configuration information for the terminal device, the two pieces of configuration information respectively correspond to the first service and the second service, the first service is one of unicast and multicast, the second service is the other one of unicast and multicast, and the priority of the first HARQ information is the same as the priority of the second HARQ information. If the first time unit overlaps the second time unit, one of the first HARQ information and the second HARQ information is sent to the network device, and the other one is discarded; or if the first time unit overlaps the second time unit, the first HARQ information and the second HARQ information are concatenated, and the HARQ information that is obtained through concatenation and that includes the first HARQ information and the second HARQ information is sent to the network device. In this way, the problem of how to send the first HARQ information and the second HARQ information in the occurrence of a resource conflict can be resolved, thereby avoiding impact on feedback of the HARQ information due to the resource conflict, and improving reliability of feedback of the HARQ information.

In a possible implementation, if the first time unit overlaps the second time unit, the sending one of the first HARQ information and the second HARQ information to the network device, and discarding the other one includes: sending the first HARQ information to the network device in the first time unit, and discarding the second HARQ information; or sending the second HARQ information to the network device in the second time unit, and discarding the first HARQ information.

In the foregoing method, if the first time unit overlaps the second time unit, the problem of how to send the first HARQ information and the second HARQ information in the occurrence of a resource conflict can be resolved according to the foregoing manner, thereby avoiding impact on feedback of the HARQ information due to the resource conflict, and improving reliability of feedback of the HARQ information.

In a possible implementation, if the first time unit overlaps at least two second time units, and each of the second time units corresponds to one piece of second HARQ information, the method further includes: sending the first HARQ information to the network device, and discarding the at least two pieces of second HARQ information; or sending at least one of the at least two pieces of second HARQ information to the network device, and discarding the first HARQ information.

In the foregoing method, if the first time unit overlaps the at least two second time unit, the problem of how to send the first HARQ information and the second HARQ information in the occurrence of a resource conflict can be resolved according to the foregoing manner, thereby avoiding impact on feedback of the HARQ information due to the resource conflict, and improving reliability of feedback of the HARQ information.

In a possible implementation, if the first time unit overlaps the second time unit, the concatenating the first HARQ information and the second HARQ information, and sending, to the network device, HARQ information that is obtained through concatenation and that includes the first HARQ information and the second HARQ information includes: sending, to the network device in the first time unit or the second time unit, the HARQ information that is obtained through concatenation and that includes the first HARQ information and the second HARQ information.

In the foregoing method, if the first time unit overlaps the second time unit, the problem of how to send the first HARQ information and the second HARQ information in the occurrence of a resource conflict can be resolved according to the foregoing manner, thereby avoiding impact on feedback of the HARQ information due to the resource conflict, and improving reliability of feedback of the HARQ information.

In a possible implementation, if the first time unit overlaps at least two second time units, and each of the second time units corresponds to one piece of second HARQ information, the method further includes: concatenating the first HARQ information and at least one piece of second HARQ information.

In a possible implementation, the method further includes: sending, to the network device in the first time unit, HARQ information that is obtained through concatenation and that includes the first HARQ information and at least one piece of second HARQ information.

In the foregoing method, if the first time unit overlaps the at least two second time unit, the problem of how to send the first HARQ information and the second HARQ information in the occurrence of a resource conflict can be resolved according to the foregoing manner, thereby avoiding impact on feedback of the HARQ information due to the resource conflict, and improving reliability of feedback of the HARQ information.

In a possible implementation, the method further includes: sending, to the network device in a second time unit corresponding to any piece of concatenated second HARQ information, HARQ information that is obtained through concatenation and that includes the first HARQ information and the at least one piece of second HARQ information.

In the foregoing method, if the first time unit overlaps the at least two second time unit, the problem of how to send the first HARQ information and the second HARQ information in the occurrence of a resource conflict can be resolved according to the foregoing manner, thereby avoiding impact on feedback of the HARQ information due to the resource conflict, and improving reliability of feedback of the HARQ information.

In a possible implementation, the first PUCCH configuration information includes the first PUCCH resource, the second PUCCH configuration information includes the second PUCCH resource, the first time unit includes the first PUCCH resource, and the second time unit includes the second PUCCH resource; and that the first time unit overlaps the second time unit is that the first PUCCH resource overlaps the second PUCCH resource.

A second aspect of embodiments of this application discloses an information receiving method, including: sending first physical uplink control channel PUCCH configuration information and second PUCCH configuration information to a terminal device, where the first PUCCH configuration information corresponds to a first service, the second PUCCH configuration information corresponds to a second service, the first PUCCH configuration information indicates a granularity of a first time unit, the second PUCCH configuration information indicates a granularity of a second time unit, and the granularity of the first time unit is different from the granularity of the second time unit; first hybrid automatic repeat request HARQ information is feedback information of data of the first service, second HARQ information is feedback information of data of the second service, and a priority of the first HARQ information is the same as a priority of the second HARQ information; and the first service is one of unicast and multicast, the second service is the other one of unicast and multicast, and the first time unit overlaps the second time unit; and receiving one of the first HARQ information and the second HARQ information from the terminal device; or receiving, from terminal device, HARQ information that is obtained through concatenation and that includes the first HARQ information and the second HARQ information.

In a possible implementation, the receiving one of the first hybrid automatic repeat request HARQ information and the second HARQ information from the terminal device includes: receiving the first HARQ information from the terminal device in the first time unit; or receiving the second HARQ information from the terminal device in the second time unit.

In a possible implementation, if the first time unit overlaps at least two second time units, and each of the second time units corresponds to one piece of second HARQ information, the method further includes: receiving the first HARQ information from the terminal device; or receiving at least one of the at least two pieces of second HARQ information from the terminal device.

In a possible implementation, the receiving, from the terminal device, HARQ information that is obtained through concatenation and that includes the first HARQ information and the second HARQ information includes: receiving, from the terminal device in the first time unit or the second time unit, the HARQ information that is obtained through concatenation and that includes the first HARQ information and the second HARQ information.

In a possible implementation, if the first time unit overlaps at least two second time units, and each of the second time units corresponds to one piece of second HARQ information, the method further includes: concatenating the first HARQ information and at least one piece of second HARQ information.

In a possible implementation, the method further includes: receiving, from the terminal device in the first time unit, HARQ information that is obtained through concatenation and that includes the first HARQ information and the at least one piece of second HARQ information.

In a possible implementation, the method further includes: receiving, from the terminal device in a second time unit corresponding to any piece of concatenated second HARQ information, HARQ information that is obtained through concatenation and that includes the first HARQ information and the at least one piece of second HARQ information.

In a possible implementation, the first PUCCH configuration information includes the first PUCCH resource, the second PUCCH configuration information includes the second PUCCH resource, the first time unit includes the first PUCCH resource, and the second time unit includes the second PUCCH resource; and that the first time unit overlaps the second time unit is that the first PUCCH resource overlaps the second PUCCH resource.

For technical effects brought by the second aspect or the possible implementations, refer to the descriptions of the technical effects brought by the first aspect or the corresponding implementations.

A third aspect of embodiments of this application discloses an information sending method, including: receiving first physical uplink control channel PUCCH configuration information and second PUCCH configuration information from a network device, where the first PUCCH configuration information corresponds to a first service, the second PUCCH configuration information corresponds to a second service, the first PUCCH configuration information indicates a granularity of a first time unit, and the second PUCCH configuration information indicates a granularity of a second time unit; determining first hybrid automatic repeat request HARQ information and second HARQ information, where the first HARQ information is feedback information of data of the first service, the second HARQ information is feedback information of data of the second service, and a priority of the first HARQ information is the same as a priority of the second HARQ information, where if the terminal device does not expect the granularity of the first time unit to be different from the granularity of the second time unit, the granularity of the first time unit indicated by the first PUCCH configuration information is the same as the granularity of the second time unit indicated by the second PUCCH configuration information; and/or if the granularity of the first time unit is different from the granularity of the second time unit, the network device is not expected to indicate the terminal device to feed back the first HARQ information and the second HARQ information in the first time unit and the second time unit that overlap in time domain; or if the granularity of the first time unit is different from the granularity of the second time unit, the first time unit does not overlap the second time unit; and sending the first HARQ information and/or the second HARQ information to the network device, where the first service is one of unicast and multicast, and the second service is the other one of unicast and multicast.

In the foregoing method, when the network device configures two pieces of configuration information for the terminal device, the two pieces of configuration information respectively correspond to the first service and the second service, the first service is one of unicast and multicast, the second service is the other one of unicast and multicast, and the priority of the first HARQ information is the same as the priority of the second HARQ information, the granularity of the first time unit is the same as the granularity of the second time unit, and/or the first time unit does not overlap the second time unit. In this way, occurrence of resource conflict behavior can be avoided, and feedback reliability of the HARQ information is improved.

In a possible implementation, the sending the first HARQ information and/or the second HARQ information to the network device includes: sending the first HARQ information to the network device in the first time unit, and/or sending the second HARQ information to the network device in the second time unit.

In another possible implementation, the granularity of the first time unit and the granularity of the second time unit are respectively a slot and a subslot.

A fourth aspect of embodiments of this application discloses an information receiving method, including: sending first physical uplink control channel PUCCH configuration information and second PUCCH configuration information to a terminal device, where the first PUCCH configuration information corresponds to a first service, the second PUCCH configuration information corresponds to a second service, the first PUCCH configuration information indicates a granularity of a first time unit, and the second PUCCH configuration information indicates a granularity of a second time unit; first hybrid automatic repeat request HARQ information is feedback information of data of the first service, second HARQ information is feedback information of data of the second service, and a priority of the first HARQ information is the same as a priority of the second HARQ information; and the first service is one of unicast and multicast, and the second service is the other one of unicast and multicast, where If the terminal device does not expect the granularity of the first time unit to be different from the granularity of the second time unit, the granularity of the first time unit indicated by the first PUCCH configuration information is the same as the granularity of the second time unit indicated by the second PUCCH configuration information; and/or if the granularity of the first time unit is different from the granularity of the second time unit, the terminal device is not indicated to feed back the first HARQ information and the second HARQ information in the first time unit and the second time unit that overlap in time domain; or if the granularity of the first time unit is different from the granularity of the second time unit, the first time unit does not overlap the second time unit; and receiving the first HARQ information and/or the second HARQ information from the terminal device.

In a possible implementation, the receiving the first HARQ information and/or the second HARQ information from the terminal device includes: receiving the first HARQ information from the terminal device in the first time unit, and/or receiving the second HARQ information from the terminal device in the second time unit.

In another possible implementation, the granularity of the first time unit and the granularity of the second time unit are respectively a slot and a subslot.

For technical effects brought by the fourth aspect or the possible implementations, refer to the descriptions of the technical effects brought by the third aspect or the corresponding implementations.

A fifth aspect of embodiments of this application discloses an information sending apparatus, including a transceiver unit and a processing unit. The transceiver unit is configured to receive first physical uplink control channel PUCCH configuration information and second PUCCH configuration information from a network device. The first PUCCH configuration information corresponds to a first service, the second PUCCH configuration information corresponds to a second service, the first PUCCH configuration information indicates a granularity of a first time unit, the second PUCCH configuration information indicates a granularity of a second time unit, and the granularity of the first time unit is different from the granularity of the second time unit. The processing unit is configured to determine first hybrid automatic repeat request HARQ information and second HARQ information, where the first HARQ information is feedback information of data of the first service, the second HARQ information is feedback information of data of the second service, and a priority of the first HARQ information is the same as a priority of the second HARQ information. The transceiver unit is configured to: when the first time unit overlaps the second time unit, send one of the first HARQ information and the second HARQ information to the network device, and discard the other one. Alternatively, the transceiver unit is configured to: when the first time unit overlaps the second time unit, concatenate the first HARQ information and the second HARQ information, and send, to the network device, HARQ information that is obtained through concatenation and that includes the first HARQ information and the second HARQ information, where the first service is one of unicast and multicast, and the second service is the other one of unicast and multicast.

In a possible implementation, the transceiver unit is configured to: when the first time unit overlaps the second time unit, send the first HARQ information to the network device in the first time unit, and discard the second HARQ information; or when the first time unit overlaps the second time unit, send the second HARQ information to the network device in the second time unit, and discard the first HARQ information.

In a possible implementation, the transceiver unit is configured to: when the first time unit overlaps at least two second time units, and each of the second time units corresponds to one piece of second HARQ information, send the first HARQ information to the network device, and discard the at least two pieces of second HARQ information; or when the first time unit overlaps at least two second time units, and each of the second time units corresponds to one piece of second HARQ information, send at least one of the at least two pieces of second HARQ information to the network device, and discard the first HARQ information.

In a possible implementation, the transceiver unit is configured to: when the first time unit overlaps the second time units, send, to the network device in the first time unit or the second time unit, the HARQ information that is obtained through concatenation and that includes the first HARQ information and the second HARQ information.

In a possible implementation, if the first time unit overlaps at least two second time units, and each of the second time units corresponds to one piece of second HARQ information, the transceiver unit is configured to: concatenate the first HARQ information and at least one piece of second HARQ information.

In a possible implementation, the transceiver unit is configured to send, to the network device in the first time unit, HARQ information that is obtained through concatenation and that includes the first HARQ information and the at least one piece of second HARQ information.

In a possible implementation, the transceiver unit is configured to send, to the network device in a second time unit corresponding to any piece of concatenated second HARQ information, HARQ information that is obtained through concatenation and that includes the first HARQ information and the at least one piece of second HARQ information.

In a possible implementation, the first PUCCH configuration information includes the first PUCCH resource, the second PUCCH configuration information includes the second PUCCH resource, the first time unit includes the first PUCCH resource, and the second time unit includes the second PUCCH resource; and that the first time unit overlaps the second time unit is that the first PUCCH resource overlaps the second PUCCH resource.

For technical effects brought by the fifth aspect or the possible implementations, refer to the descriptions of the technical effects brought by the first aspect or the corresponding implementations.

A sixth aspect of embodiments of this application discloses an information receiving apparatus, including a transceiver unit and a processing unit. The processing unit is configured to send first physical uplink control channel PUCCH configuration information and second PUCCH configuration information to a terminal device by using the transceiver unit. The first PUCCH configuration information corresponds to a first service, the second PUCCH configuration information corresponds to a second service, the first PUCCH configuration information indicates a granularity of a first time unit, the second PUCCH configuration information indicates a granularity of a second time unit, and the granularity of the first time unit is different from the granularity of the second time unit. First hybrid automatic repeat request HARQ information is feedback information of data of the first service, second HARQ information is feedback information of data of the second service, and a priority of the first HARQ information is the same as a priority of the second HARQ information. The first service is one of unicast and multicast, the second service is the other one of unicast and multicast, and the first time unit overlaps the second time unit. The transceiver unit is configured to receive one of the first HARQ information and the second HARQ information from the terminal device. Alternatively, the transceiver unit is configured to receive, from the terminal device, HARQ information that is obtained through concatenation and that includes the first HARQ information and the second HARQ information.

In a possible implementation, the transceiver unit is configured to receive the first HARQ information from the terminal device in the first time unit, or the transceiver unit is configured to receive the second HARQ information from the terminal device in the second time unit.

In a possible implementation, if the first time unit overlaps at least two second time units, and each of the second time units corresponds to one piece of second HARQ information, the transceiver unit is configured to receive the first HARQ information from the terminal device, or the transceiver unit is configured to receive at least one of the at least two pieces of second HARQ information from the terminal device.

In a possible implementation, the transceiver unit is configured to receive, from the terminal device in the first time unit or the second time unit, the HARQ information that is obtained through concatenation and that includes the first HARQ information and the second HARQ information.

In a possible implementation, if the first time unit overlaps at least two second time units, and each of the second time units corresponds to one piece of second HARQ information, the transceiver unit is configured to: concatenate the first HARQ information and at least one piece of second HARQ information.

In a possible implementation, the transceiver unit is configured to receive, from the terminal device in the first time unit, HARQ information that is obtained through concatenation and that includes the first HARQ information and the at least one piece of second HARQ information.

In a possible implementation, the transceiver unit is configured to receive, from the terminal device in a second time unit corresponding to any piece of concatenated second HARQ information, HARQ information that is obtained through concatenation and that includes the first HARQ information and the at least one piece of second HARQ information.

In a possible implementation, the first PUCCH configuration information includes the first PUCCH resource, the second PUCCH configuration information includes the second PUCCH resource, the first time unit includes the first PUCCH resource, and the second time unit includes the second PUCCH resource; and that the first time unit overlaps the second time unit is that the first PUCCH resource overlaps the second PUCCH resource.

For technical effects brought by the sixth aspect or the possible implementations, refer to the descriptions of the technical effects brought by the first aspect or the corresponding implementations.

A seventh aspect of embodiments of this application discloses an information sending apparatus, including a transceiver unit and a processing unit. The transceiver unit is configured to receive first physical uplink control channel PUCCH configuration information and second PUCCH configuration information from a network device. The first PUCCH configuration information corresponds to a first service, the second PUCCH configuration information corresponds to a second service, the first PUCCH configuration information indicates a granularity of a first time unit, and the second PUCCH configuration information indicates a granularity of a second time unit. The processing unit is configured to determine first hybrid automatic repeat request HARQ information and second HARQ information, where the first HARQ information is feedback information of data of the first service, the second HARQ information is feedback information of data of the second service, and a priority of the first HARQ information is the same as a priority of the second HARQ information. If the apparatus does not expect the granularity of the first time unit to be different from the granularity of the second time unit, the granularity of the first time unit indicated by the first PUCCH configuration information is the same as the granularity of the second time unit indicated by the second PUCCH configuration information; and/or if the granularity of the first time unit is different from the granularity of the second time unit, the network device is not expected to indicate the terminal device to feed back the first HARQ information and the second HARQ information in the first time unit and the second time unit that overlap in time domain; or if the granularity of the first time unit is different from the granularity of the second time unit, the first time unit does not overlap the second time unit. The transceiver unit is configured to send the first HARQ information and/or the second HARQ information to the network device, where the first service is one of unicast and multicast, and the second service is the other one of unicast and multicast.

In a possible implementation, the transceiver unit is configured to: send the first HARQ information to the network device in the first time unit, and/or send the second HARQ information to the network device in the second time unit.

In another possible implementation, the granularity of the first time unit and the granularity of the second time unit are respectively a slot and a subslot.

For technical effects brought by the seventh aspect or the possible implementations, refer to the descriptions of the technical effects brought by the third aspect or the corresponding implementations.

An eighth aspect of embodiments of this application discloses an information receiving apparatus, including a transceiver unit and a processing unit.

The processing unit is configured to send first physical uplink control channel PUCCH configuration information and second PUCCH configuration information to a terminal device by using the transceiver unit, where the first PUCCH configuration information corresponds to a first service, the second PUCCH configuration information corresponds to a second service, the first PUCCH configuration information indicates a granularity of a first time unit, and the second PUCCH configuration information indicates a granularity of a second time unit. First hybrid automatic repeat request HARQ information is feedback information of data of the first service, second HARQ information is feedback information of data of the second service, and a priority of the first HARQ information is the same as a priority of the second HARQ information. The first service is one of unicast and multicast, and the second service is the other one of unicast and multicast. If the terminal device does not expect the granularity of the first time unit to be different from the granularity of the second time unit, the granularity of the first time unit indicated by the first PUCCH configuration information is the same as the granularity of the second time unit indicated by the second PUCCH configuration information; and/or if the granularity of the first time unit is different from the granularity of the second time unit, the terminal device is not indicated to feed back the first HARQ information and the second HARQ information in the first time unit and the second time unit that overlap in time domain; or if the granularity of the first time unit is different from the granularity of the second time unit, the first time unit does not overlap the second time unit. The transceiver unit is configured to receive the first HARQ information and/or the second HARQ information from the terminal device.

In a possible implementation, the transceiver unit is configured to: receive the first HARQ information from the terminal device in the first time unit, and/or receive the second HARQ information from the terminal device in the second time unit.

In another possible implementation, the granularity of the first time unit and the granularity of the second time unit are respectively a slot and a subslot.

For technical effects brought by the eighth aspect or the possible implementations, refer to the descriptions of the technical effects brought by the third aspect or the corresponding implementations.

A ninth aspect of embodiments of this application discloses an information sending apparatus. The apparatus includes at least one processor, and the at least one processor is configured to execute computer programs or instructions stored in at least one memory, so that the apparatus implements the method according to the first aspect or the possible implementations of the first aspect.

A tenth aspect of embodiments of this application discloses an information receiving apparatus. The apparatus includes at least one processor, and the at least one processor is configured to execute computer programs or instructions stored in at least one memory, so that the apparatus implements the method according to the second aspect or the possible implementations of the second aspect.

An eleventh aspect of embodiments of this application discloses an information sending apparatus. The apparatus includes at least one processor, and the at least one processor is configured to execute computer programs or instructions stored in at least one memory, so that the apparatus implements the method according to the third aspect or the possible implementations of the third aspect.

A twelfth aspect of embodiments of this application discloses an information receiving apparatus. The apparatus includes at least one processor, and the at least one processor is configured to execute computer programs or instructions stored in at least one memory, so that the apparatus implements the method according to the fourth aspect or the possible implementations of the fourth aspect.

A thirteenth aspect of embodiments of this application discloses a chip system. The chip system includes at least one processor and a communication interface, and the at least one processor is configured to execute computer programs or instructions, to implement the method according to any one of the foregoing aspects.

A fourteenth aspect of embodiments of this application discloses a computer-readable storage medium. The computer-readable storage medium stores computer instructions. When the computer instructions are run on a processor, the method according to any one of the foregoing aspects is implemented.

A fifteenth aspect of embodiments of this application discloses a computer program product. The computer program product includes computer program code. When the computer program code is run on a computer, the method according to any one of the foregoing aspects is implemented.

BRIEF DESCRIPTION OF DRAWINGS

The following describes the accompanying drawings used in embodiments of this application.

DESCRIPTION OF EMBODIMENTS

The following describes embodiments of this application with reference to the accompanying drawings in embodiments of this application.

The technical solutions provided this application may be applied to various communication systems, such as a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communication system, a 5th generation (5th Generation, 5G) mobile communication system, or a new radio access technology (new radio access technology, NR) system. The 5G mobile communication system may include a non-standalone (non-standalone, NSA) communication system and/or a standalone (standalone, SA) communication system.

The technical solutions provided in this application may also be applied to a machine type communication (machine type communication, MTC) network, a long term evolution-machine type communication technology (long term evolution-machine, LTE-M), a device-to-device (device-to-device, D2D) network, a machine to machine (machine to machine, M2M) network, an internet of things (internet of things, IoT) network, or another network. The IoT network may include, for example, an internet of vehicles. Communication modes in an internet of vehicles system are collectively referred to as vehicle to X (vehicle to X, V2X, where X may represent anything). For example, V2X may include vehicle to vehicle (vehicle to vehicle, V2V) communication, vehicle to infrastructure (vehicle to infrastructure, V2I) communication, vehicle to pedestrian (vehicle to pedestrian, V2P) communication, vehicle to network (vehicle to network, V2N) communication, or the like. A V2X communication system uses a sidelink (sidelink, SL) transmission technology based on D2D communication.

The technical solutions provided in this application may be further applied to a future communication system, for example, a 6th generation mobile communication system. This is not limited in this application.

Figure 1:
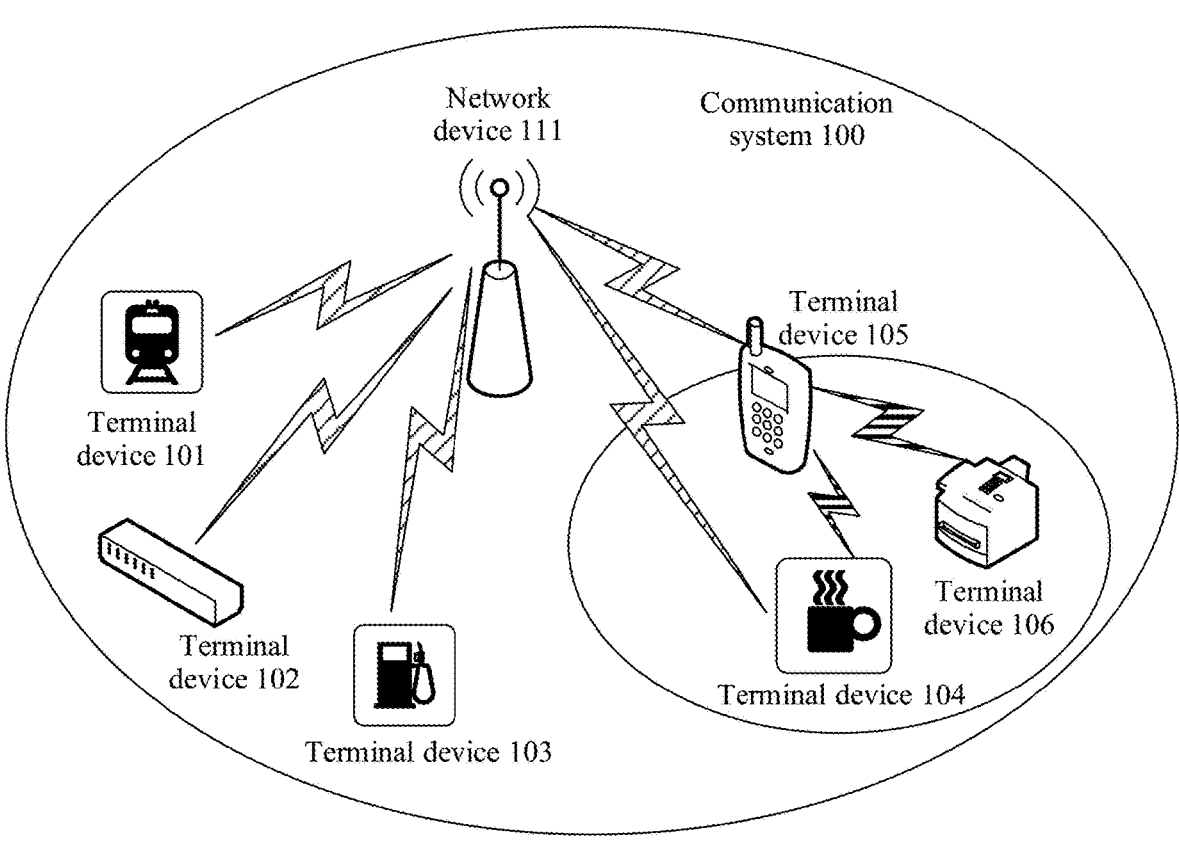
FIG. 1 is a schematic diagram of a structure of a communication system according to an embodiment of this application.

FIG. 1 is a schematic diagram of a structure of a communication system 100 applicable to embodiments of this application. The communication system 100 includes a network device 111, a terminal device 101, a terminal device 102, a terminal device 103, a terminal device 104, a terminal device 105, and a terminal device 106. It should be understood that the communication system 100 may include more network devices or more or fewer terminal devices. The network device and the terminal device may be hardware, may be software obtained through functional division, or may be a combination thereof. The network device and the terminal device may communicate with each other by using another device or network element. In the system, the network device 111 may transmit data with a plurality of terminal devices, that is, the network device 111 sends downlink data to the terminal device 101 to the terminal device 106. Certainly, the terminal device 101 to the terminal device 106 may send uplink data to the network device 111. In addition, the terminal device 104, the terminal device 105, and the terminal device 106 may alternatively form a communication system. In the system, the network device 111 may send downlink data to the terminal device 101, the terminal device 102, and the terminal device 105, and then the terminal device 105 sends the downlink data to the terminal device 104 or the terminal device 106. The method in embodiments of this application may be applied to the communication system 100 shown in FIG. 1.

(1) Terminal device: A terminal device includes a device that provides a voice and/or data connectivity for a user. Specifically, the terminal device includes a device that provides a voice for the user, includes a device that provides data connectivity for the user, or includes a device that provides a voice and data connectivity for the user. For example, the terminal device may include a handheld device with a wireless connection function, or a processing device connected to a wireless modem. The terminal device may communicate with a core network through a radio access network (radio access network, RAN), and exchange a voice or data with the RAN, or exchange a voice and data with the RAN. The terminal device may include user equipment (user equipment, UE), a wireless terminal device, a mobile terminal device, a device-to-device (device-to-device, D2D) terminal device, a vehicle-to-everything (vehicle-to-everything, V2X) terminal device, a machine-to-machine/machine type communications (machine-to-machine/machine type communications, M2M/MTC) terminal device, an internet of things (internet of things, IoT) terminal device, light user equipment (light UE), reduced capability user equipment (reduced capability UE, REDCAP UE), a subscriber unit (subscriber unit), a sub scriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device may include a mobile phone (or referred to as a "cellular" phone), a computer with a mobile terminal device, or a portable, pocket-sized, handheld, computer built-in mobile apparatus, or the like. For example, the terminal device may be a device such as a personal communication service (personal communication service, PCS) phone, a cordless telephone, a session initiation protocol (session initiation protocol, SIP) phone, a wireless local loop (wireless local loop, WLL) station, a personal digital assistant (personal digital assistant, PDA), or the like. The terminal device may alternatively include a limited device, for example, a device with relatively low power consumption, a device with a limited storage capability, a device with a limited computing capability, or the like. For example, the terminal device includes an information sensing device such as a barcode, radio frequency identification (radio frequency identification, RFID), a sensor, a global positioning system (global positioning system, GPS), a laser scanner, or the like.

As an example instead of a limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, shoes, and the like. The wearable device is a portable device that is directly worn on a body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches, smart glasses, or the like, and include devices that dedicated to only one type of application function and need to collaboratively work with other devices such as smartphones, for example, various smart bands, smart helmets, smart jewelry for monitoring physical signs, or the like.

If the various terminal devices described above are located in a vehicle (for example, placed in the vehicle or installed in the vehicle), the terminal devices may be all considered as vehicle-mounted terminal devices. For example, the vehicle-mounted terminal device is also referred to as an on-board unit (on-board unit, OBU).

In embodiments of this application, the terminal device may further include a relay (relay). Alternatively, it may be understood as that all devices that can perform data communication with the base station may be considered as terminal devices.

In embodiments of this application, an apparatus configured to implement a function of the terminal device may be a terminal device, or may be an apparatus that can support the terminal device in implementing the function, for example, a chip system. The apparatus may be installed in the terminal device. In embodiments of this application, the chip system may include a chip, or may include a chip and another discrete component. In the technical solutions provided in embodiments of this application, an example in which an apparatus configured to implement a function of a terminal is a terminal device is used to describe the technical solutions provided in embodiments of this application.

(2) Network device: A network device includes, for example, an access network (access network, AN) device such as a base station (for example, an access point), and may be a device that is in an access network and that communicates with a wireless terminal device over an air interface through one or more cells. Alternatively, the network device is, for example, a road side unit (road side unit, RSU) in a vehicle-to-everything (vehicle-to-everything, V2X) technology. The base station may be configured to perform mutual conversion between a received over-the-air frame and an IP packet, and serve as a router between the terminal device and a remaining part of the access network. The remaining part of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (NodeB, eNB, or e-NodeB, evolved NodeB) in a long term evolution (long term evolution, LTE) system or a long term evolution-advanced (long term evolution-advanced, LTE-A) system, may include a next generation NodeB (next generation NodeB, gNB) in a 5th generation (5th generation, 5G) mobile communication technology NR system (also briefly referred to as an NR system), or may include a centralized unit (centralized unit, CU) and a distributed unit (distributed unit, DU) in a cloud radio access network (cloud radio access network, Cloud RAN) system. This is not limited in embodiments of this application.

The network device may further include a core network device. The core network device includes, for example, an access and mobility management function (access and mobility management function, AMF), a user plane function (user plane function, UPF), a session management function (session management function, SMF), or the like.

In embodiments of this application, an apparatus configured to implement a function of the network device may be a network device, or may be an apparatus that can support the network device in implementing the function, for example, a chip system. The apparatus may be installed in the network device. In the technical solutions provided in embodiments of this application, an example in which the apparatus configured to implement the function of the network device is the network device is used to describe the technical solutions provided in embodiments of this application.

Some terms in this application are first described, to help persons skilled in the art have a better understanding.

(1) The International Telecommunication Union (International Telecommunication Union, ITU) defines three major application scenarios for 5G and future mobile communication systems: enhanced mobile broadband (enhanced mobile broadband, eMBB), ultra-reliable and low-latency communications (ultra-reliable and low-latency communications, URLLC), and massive machine type communications (massive machine type communications, mMTC).

Typical eMBB services include an ultra high-definition video, augmented reality (augmented reality, AR), virtual reality (virtual reality, VR), and the like. These services have a large data transmission amount and a very high transmission rate.

Typical URLLC services include wireless control in an industrial manufacturing or production process, motion control and remote repair of a self-driving car and an unmanned aircraft, a tactile interaction application such as remote surgery, and the like. These services require ultra-high reliability and a low latency, and have a small data transmission amount, and burstiness.

Typical mMTC services include smart grid distribution automation, smart cities, and the like. These services feature a huge quantity of connected network devices, a small data transmission amount, and insensitivity of data to transmission latency. These mMTC terminals need to satisfy requirements of low costs and extremely long standby duration.

(2) A multimedia broadcast multicast service (multimedia broadcast multicast service, MBMS) supports providing a multicast/broadcast network in a cellular system, and is a technology for transmitting data from one data source to a plurality of terminal devices. MBMS is a service oriented to a plurality of terminal devices, for example, a live broadcast service, a public security service, a batch software update service, and the like. Receiving of a plurality of terminal devices needs to be considered for transmission of the MBMS service. A multicast (multicast) transmission technology, namely, a technology of sending the MBMS service to a plurality of terminal devices through a common transmission path, may be used, that is, a plurality of terminal devices are required to receive same data at the same time. Compared with a common data service, the MBMS service is characterized by a large data volume, long duration, and delay sensitivity. Alternatively, a unicast transmission technology, namely, a technology of sending the MBMS service to a plurality of terminal devices through transmission channels separately established with the plurality of terminal devices, may be used.

Figure 2:
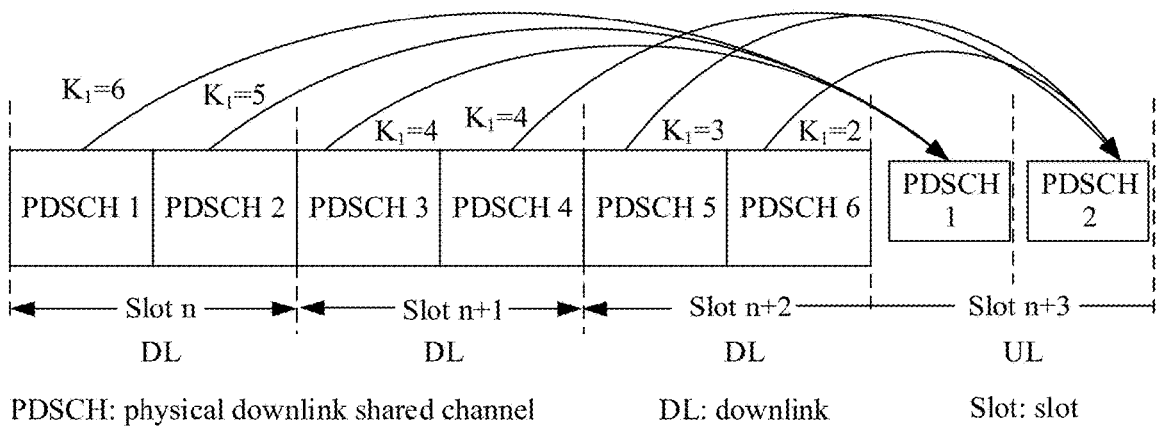
FIG. 2 is a schematic diagram of a HARQ information feedback according to an embodiment of this application.

(3) A hybrid automatic repeat request (hybrid automatic repeat request, HARQ) is an efficient transmission mechanism. Reliability of downlink data transmission can be greatly improved through retransmission. After receiving data information sent by a network device, a terminal device needs to feed back a HARQ acknowledgment (acknowledgement, ACK) or a HARQ negative acknowledgment (negative acknowledgment, NACK) to the network device. The network device performs retransmission only when the terminal device feeds back the NACK to the network device. Consequently, overall resource consumption of data transmission is reduced. Currently, when feeding back HARQ information, the terminal device needs to feed back the HARQ information in an uplink slot. A mechanism of feeding back a plurality of pieces of HARQ information in a same uplink slot is supported. To be specific, the terminal device can simultaneously feed back a plurality of pieces of HARQ information to the network device in a same uplink slot, so that the network device determines whether the terminal device correctly receives data that is sent through a plurality of pieces of semi-persistent scheduling (semi-persistent scheduling, SPS) or downlink control information (downlink control information, DCI) scheduling. As shown in FIG. 2, the terminal device needs to feed back, on a physical uplink control channel (physical uplink control channel, PUCCH) 1, whether data received on a physical downlink shared channel (physical downlink share channel, PDSCH) 1, a PDSCH 2, and a PDSCH 3 is correct, and needs to feed back, on a PUCCH 2, whether data received on a PDSCH 4, a PDSCH 5, and a PDSCH 6 is correct. Therefore, when the plurality of pieces of HARQ information are fed back in a same uplink slot simultaneously, a combination sorting manner of the HARQ information needs to be defined, and combined HARQ information may be referred to as a HARQ acknowledgment (HARQ-ACK) codebook. The terminal device may further determine, based on a size of the codebook, physical uplink control channel (physical uplink control channel, PUCCH) resources to be used for transmission that are configured in a physical uplink control channel configuration (physical uplink control channel config, PUCCH-config) in higher layer signaling.

(4) Unicast PUCCH-config: A unicast PUCCH-config is configured by the network device for the terminal device via higher layer radio resource control (radio resource control, RRC) signaling, for configuring a parameter of a PUCCH of a specific terminal device. For example, some example fields in the unicast PUCCH-config are specifically as follows:

resourceSetToAddModList: resourceSetToAddModList is used to configure a PUCCH-ResourceSet, where there are a maximum of four PUCCH-ResourceSets;

resourceToAddModList: resourceToAddModList is used to configure a PUCCH-Resource, where each PUCCH-ResourceSet includes a maximum of eight PUCCH-Resources;

dl-DataToUL-ACK-r16: dl-DataToUL-ACK-r16 is used to configure $K_1$, where $K_1$ indicates a quantity of minimum time units between a PDSCH and a PUCCH; and

| subslotLengthForPUCCH-r16 | CHOICE { |
| normalCP-r16 | ENUMERATED {n2, n7}, |
| extendedCP-r16 | ENUMERATED {n2, n6} |
| }. | |

If a sub slotLengthForPUCCH-r16 field is configured in the unicast PUCCH-config, it indicates that a granularity of a time unit may be a subslot (subslot). If no sub slotLength-ForPUCCH-r16 field is configured in the unicast PUCCH-config, it indicates that a granularity of a time unit may be a slot (slot).

At present, in a unicast case, the network device configures a maximum of two unicast PUCCH-configs for the terminal device. If two unicast PUCCH-configs are configured, there may be two HARQ-ACK codebooks, corresponding to a low priority and a high priority. If PUCCH resources of the two HARQ-ACK codebooks do not overlap, the two HARQ-ACK codebooks may be sent on the PUCCH resources. If the network device configures one unicast PUCCH-config for the terminal device, and the unicast PUCCH-config indicates one time unit, there may be one HARQ-ACK codebook, corresponding to a low priority by default. In this case, the HARQ-ACK codebook is sent in the time unit (slot/subslot).

Figure 3:
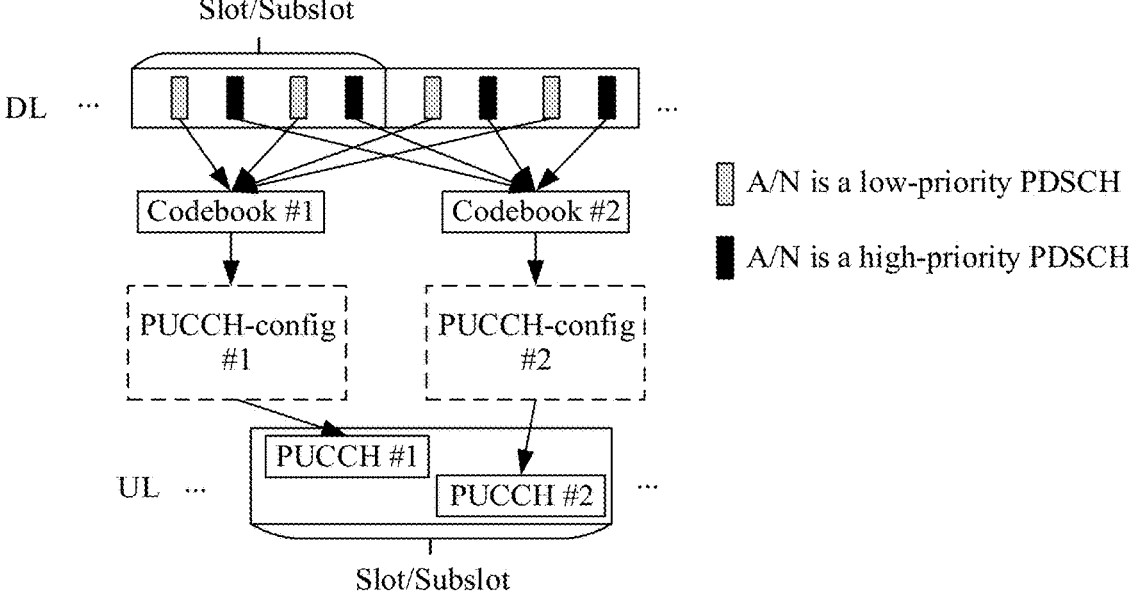
FIG. 3 is a schematic diagram of determining a PUCCH resource according to an embodiment of this application.

(5) In a unicast case, how to determine a PUCCH resource based on a HARQ-ACK codebook is specifically as follows. As shown in FIG. 3, the network device sends DCI to the terminal device, where the DCI includes $K_1$, where $K_1$ indicates a quantity of minimum time units between a PDSCH and a PUCCH. Then, the network device sends the PDSCH to the terminal device. Correspondingly, the terminal device receives the DCI and the PDSCH from the network device, determines HARQ information in a same uplink slot based on $K_1$ in the DCI, and generates a HARQ-ACK codebook. If there are two physical priorities, two HARQ-ACK codebooks are generated. As shown in FIG. 3, a codebook #1 and a codebook #2 are generated, where a priority of the codebook #1 is a lower priority, and a priority of the codebook #2 is a higher priority.

Then, a to-be-used set in the four PUCCH-ResourceSets indicated by resourceSetToAddModList in the PUCCH-config is determined based on a size of the HARQ-ACK codebook. If the codebook size is less than or equal to 2 bits, it is determined that a first set is used. If the codebook size is greater than 2 bits and is less than or equal to N2, it is determined that a second set is used. If the codebook size is greater than N2 and is less than or equal to N3, it is determined that a third set is used. If the codebook size is greater than N3 and is less than or equal to 1706 bits, it is determined that a fourth set is used. In an example, it is assumed that the four sets are a set 1, a set 2, a set 3, and a set 4. If the codebook size is 1 bit, it is determined that the set 1 is used.

After a to-be-used set is determined, a to-be-used resource in the set is determined based on a PUCCH resource indicator (PUCCH resource indicator, PRI) field in the DCI. The PRI occupies 3 bits, and may indicate one of a plurality of PUCCH-Resources.

Figure 4:
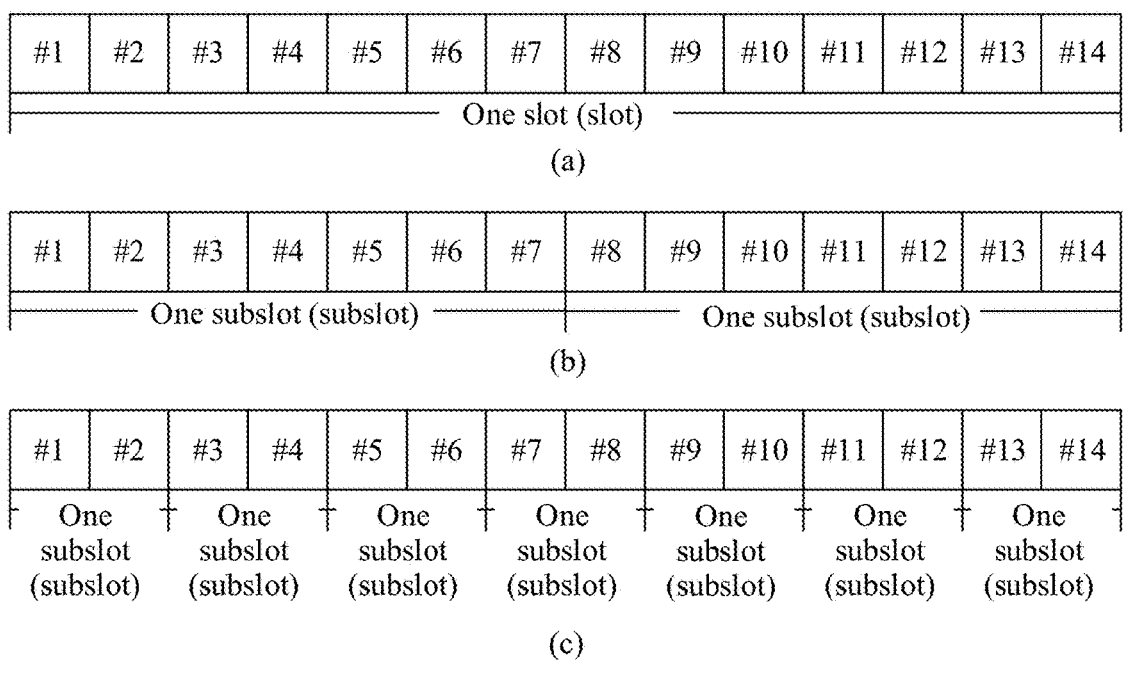
FIG. 4 is a schematic diagram of a slot and a subslot according to an embodiment of this application.

(6) Slot (slot) and subslot (subslot): In FIG. 4, as shown in (a) in FIG. 4, a slot (slot) may include 14 symbols, which are a symbol 1 to a symbol 14. A sub slot (subslot) may include two symbols or seven symbols. A case in which a subslot (subslot) includes seven symbols is shown in (b) in FIG. 4. A symbol 1 to a symbol 7 may be a subslot (subslot), and a symbol 8 to a symbol 14 may be another subslot (subslot). A case in which a subslot (subslot) includes two symbols is shown in (c) in FIG. 4. A symbol 1 and ae symbol 2 may be a subslot (subslot), a symbol 3 and a symbol 4 may be another subslot (subslot), or the like.

At present, in a unicast case, a physical layer supports a maximum of two priorities. When the network device configures two PUCCH-configs, namely, a PUCCH-config 1 and a PUCCH-config 2, for the terminal device, priorities of unicast HARQ-ACK codebooks corresponding to the PUCCH-config 1 and the PUCCH-config 2 are definitely different. Alternatively, if the network device configures only one PUCCH-config for the terminal device, a priority of a unicast HARQ-ACK codebook corresponding to the PUCCH-config is a low priority. In a multicast case, when the network device configures a multicast PUCCH-config, which may be denoted as PUCCH-config-MBS, for the terminal device, and a priority of a multicast HARQ-ACK codebook corresponding to the PUCCH-config-MBS also exists. In this case, when the network device configures a multicast PUCCH-config and a unicast PUCCH-config for the terminal device, and the priority of the multicast HARQ-ACK codebook is the same as a priority of a unicast HARQ-ACK codebook, how the terminal device sends, when a conflict occurs between a resource indicated by multicast configuration information and a resource indicated by unicast configuration information, HARQ information corresponding to unicast and HARQ information corresponding to multicast is a technical problem being resolved by a person skilled in the art.

Figure 5:
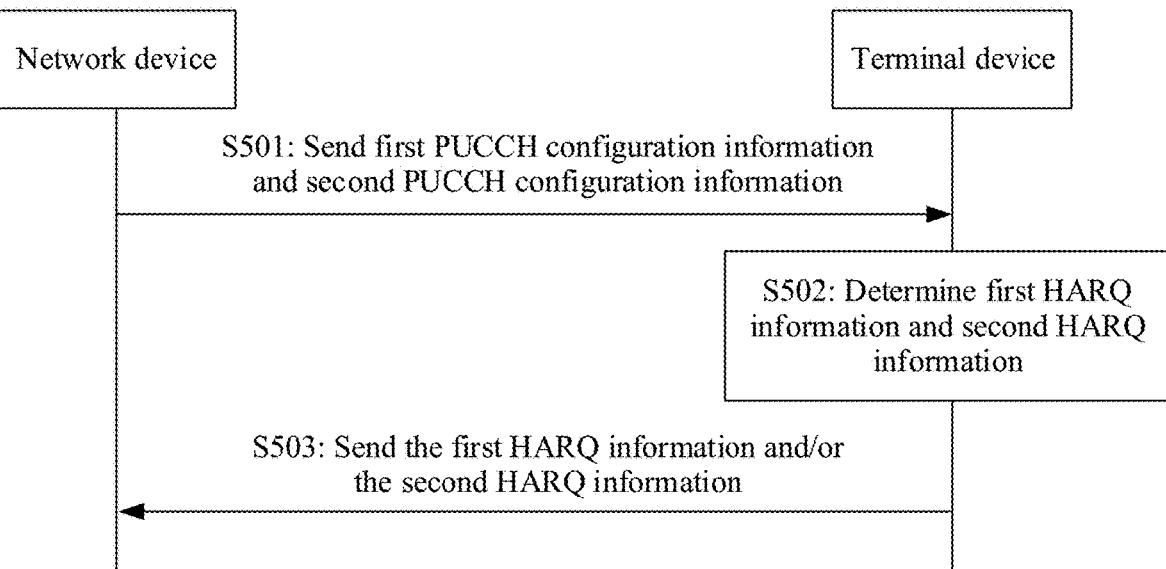
FIG. 5 is a flowchart of an information sending or receiving method according to an embodiment of this application.

FIG. 5 shows an information sending or receiving method according to an embodiment of this application. The method includes but is not limited to the following steps.

Step S501: A network device sends first PUCCH configuration information and second PUCCH configuration information to a terminal device. Correspondingly, the terminal device receives the first PUCCH configuration information and the second PUCCH configuration information from the network device.

The first PUCCH configuration information and the second PUCCH configuration information may be included in one piece of RRC signaling, or may be included in separate pieces of RRC signaling. The first PUCCH configuration information corresponds to a first service, and the second PUCCH configuration information corresponds to a second service. For example, the first PUCCH configuration information is used to configure sending of the first service, and the second PUCCH configuration information is used to configure sending of the second service. The first service is one of unicast and multicast, and the second service is the other one of unicast and multicast. For example, the first PUCCH configuration information corresponds to unicast, and the second PUCCH configuration information corresponds to multicast.

Specifically, the first PUCCH configuration information indicates a granularity of a first time unit, and the second PUCCH configuration information indicates a granularity of a second time unit. The granularity of the first time unit is different from the granularity of the second time unit. Each of the first time unit and the second time unit may be a unit time unit. That the granularity of the first time unit is different from the granularity of the second time unit may mean that the first time unit and the second time unit have different symbol durations, or include different quantities of symbols. For example, that the granularity of the first time unit is different from the granularity of the second time unit may mean that the granularity of the first time unit is a slot (slot), and the granularity of the second time unit is a sub slot (subslot). That the granularity of the first time unit is different from the granularity of the second time unit may mean that the granularity of the first time unit is a slot (slot), the first time unit includes 14 symbols; while the granularity of the second time unit is a subslot (subslot), and the second time unit includes two or seven symbols.

Specifically, the first PUCCH configuration information and the second PUCCH configuration information may be similar to the unicast PUCCH-config. For example, the first PUCCH configuration information and the second PUCCH configuration information each include fields resourceSetToAddModList, resourceToAddModList, dl-DataToUL-ACK-r16, and subslotLengthForPUCCH-r16. Assuming that subslotLengthForPUCCH-r16 in the first PUCCH configuration information is configured, it indicates that the granularity of the first time unit indicated by the first PUCCH configuration information is a subslot (subslot). Assuming that subslotLengthForPUCCH-r16 in the first PUCCH configuration information is not configured, it indicates that the granularity of the first time unit indicated by the first PUCCH configuration information is a slot (slot). This also applies to the second PUCCH configuration information. Details are not described herein again.

Step S502: The terminal device determines first HARQ information and second HARQ information.

Specifically, the first HARQ information is feedback information of data of the first service, and the second HARQ information is feedback information of data of the second service. The first service is one of unicast and multicast, and the second service is the other one of unicast and multicast. For example, the first HARQ information is feedback information of unicast data, and the second HARQ information is feedback information of multicast data. Alternatively, for example, the first HARQ information is feedback information of multicast data, and the second HARQ information is feedback information of unicast data. For ease of description, in a subsequent embodiment, an example in which the first PUCCH configuration information corresponds to unicast, the second PUCCH configuration information corresponds to multicast, the first HARQ information is feedback information of unicast data, and the second HARQ information is feedback information of multicast data is used for description.

Specifically, a priority of the first HARQ information is the same as a priority of the second HARQ information. Optionally, that the priority of the first HARQ information is the same as the priority of the second HARQ information may be determined by receiving information from the network device, where the information may be DCI.

Step S503: The terminal device sends the first HARQ information and/or the second HARQ information to the network device.

Correspondingly, the network device receives the first HARQ information and/or the second HARQ information from the terminal device.

Specifically, the terminal device may send the first HARQ information and/or the second HARQ information to the network device in the following two manners.

Manner 1: If the first time unit overlaps the second time unit, the terminal device sends one of the first HARQ information and the second HARQ information to the network device, and discards the other one. That is, the terminal device chooses to send one of the first HARQ information and the second HARQ information, and discards the other one.

Manner 2: If the first time unit overlaps the second time unit, the terminal device concatenates the first HARQ information and the second HARQ information, and sends, to the network device, HARQ information that is obtained through concatenation and that includes the first HARQ information and the second HARQ information. Concatenation may be serial connection, splicing, combination, or the like.

Figures 6, 7:
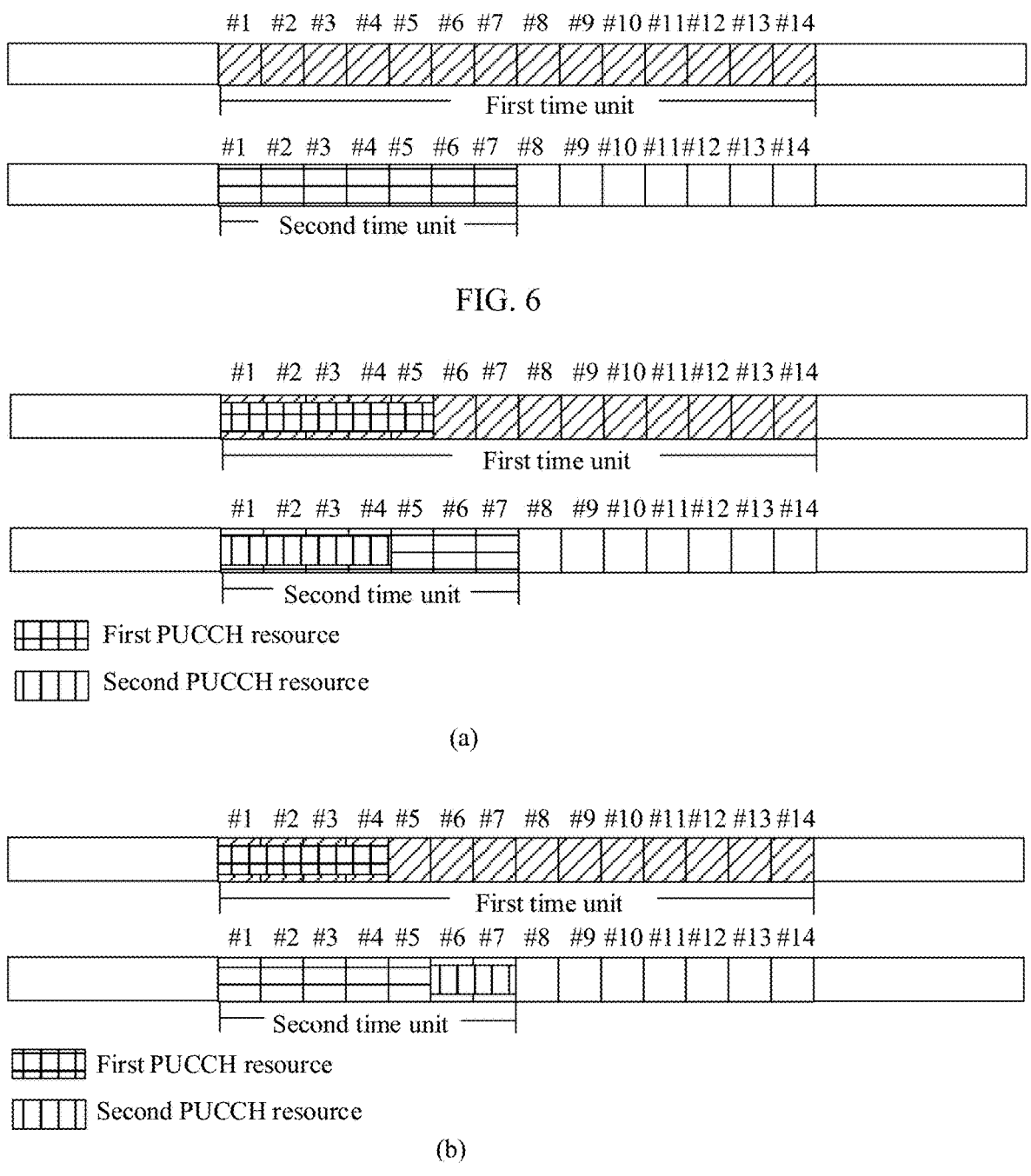
FIG. 6 is a schematic diagram in which a first time unit overlaps a second time unit according to an embodiment of this application.
FIG. 7 is a schematic diagram in which a first PUCCH resource overlaps or does not overlap a second PUCCH resource according to an embodiment of this application.

Specifically, the first PUCCH configuration information indicates the granularity of the first time unit, the second PUCCH configuration information indicates the granularity of the second time unit, and the first PUCCH configuration information and the second PUCCH configuration information may be similar to the unicast PUCCH-config. For example, the first PUCCH configuration information and the second PUCCH configuration information each include fields resourceSetToAddModList, resourceToAddModList, dl-DataToUL-ACK-r16, and sub slotLengthForPUCCH-r16. The fields resourceSetToAddModList and resourceToAddModList indicate a PUCCH resource. The first time unit may include a time domain resource of the PUCCH resource, and the second time unit may include a time domain resource of the PUCCH resource. Therefore, that the first time unit overlaps the second time unit may be as shown in FIG. 6. For example, the first time unit includes 14 symbols, which are a symbol #1 to a symbol #14, and the second time unit includes seven symbols, which are a symbol #1 to a symbol #7. All of the seven symbols included in the second time unit are included in the 14 symbols in the first time unit. Such overlapping shown in FIG. 6 may be referred to as a first type of overlapping.

It is assumed that the first time unit includes a first PUCCH resource, and the second time unit includes a second PUCCH resource. That the first time unit overlaps the second time unit may alternatively mean that the first PUCCH resource in the first time unit overlaps the second PUCCH resource in the second time unit. As shown in (a) in FIG. 7, the first PUCCH resource overlaps the second PUCCH resource. For example, the first time unit includes 14 symbols, which are a symbol #1 to a symbol #14, and the second time unit includes seven symbols, which are a symbol #1 to a symbol #7. A time domain resource of the first PUCCH resource is on the symbol #1 to the symbol #5 in the first time unit, a time domain resource of the second PUCCH resource is on the symbol #1 to the symbol #4 in the second time unit, and the symbol #1 to the symbol #5 in the first time unit include the symbol #1 to the symbol #4 in the second time unit. Therefore, the first PUCCH resource overlaps the second PUCCH resource. To describe the concept of overlapping between the first PUCCH resource and the second PUCCH resource more clearly, it is assumed that the first time unit includes the first PUCCH resource, and the second time unit includes the second PUCCH resource. As shown in (b) in FIG. 7, the first PUCCH resource does not overlap the second PUCCH resource. For example, the first time unit includes 14 symbols, which are a symbol #1 to a symbol #14, and the second time unit includes seven symbols, which are a symbol #1 to a symbol #7. A time domain resource of the first PUCCH resource is on the symbol #1 to the symbol #4 in the first time unit, a time domain resource of the second PUCCH resource is on the symbol #6 and the symbol #7 in the second time unit, and the symbol #1 to the symbol #4 in the first time unit do not overlap the symbol #6 and the symbol #7 in the second time unit. Therefore, the first PUCCH resource does not overlap the second PUCCH resource. Such overlapping between the first PUCCH resource and the second PUCCH resource may be referred to as a second type of overlapping. The first type of overlapping and the second type of overlapping are two interpretations of overlapping between the first time unit and the second time unit.

The following separately describes the foregoing two manners.

Manner 1:

In Manner 1, in the case of the first type of overlapping (overlapping shown in FIG. 6), the terminal device sends one of the first HARQ information and the second HARQ information to the network device, and discards the other one. In the case of the second type of overlapping (overlapping of the PUCCH resources shown in (a) in FIG. 7), the terminal device sends one of the first HARQ information and the second HARQ information to the network device, and discards the other one.

In the case of the first type of overlapping, that the terminal device sends one of the first HARQ information and the second HARQ information to the network device, and discards the other one is specifically as follows.

In a possible implementation, if the first time unit overlaps the second time unit, that the terminal device sends one of the first HARQ information and the second HARQ information to the network device, and discards the other one includes: sending the first HARQ information to the network device in the first time unit, and discarding the second HARQ information; or sending the second HARQ information to the network device in the second time unit, and discarding the first HARQ information.

Specifically, if the first time unit includes the first PUCCH resource, and the second time unit includes the second PUCCH resource, the terminal device may send the first HARQ information to the network device, and discard the second HARQ information on the first PUCCH resource, or the terminal device may send the second HARQ information to the network device, and discard the first HARQ information on the second PUCCH resource. The first PUCCH resource is based on the first PUCCH configuration information, and the second PUCCH resource is based on the second PUCCH configuration information.

In an example, as shown in FIG. 6, the first time unit overlaps the second time unit. It is assumed that the first service corresponding to the first PUCCH configuration information is unicast, the second PUCCH configuration information corresponding to the second service is multicast, the granularity of the first time unit is a slot (slot), and the granularity of the second time unit is a sub slot (subslot). Because the first HARQ information is the feedback information of the data of the first service, and the second HARQ information is the feedback information of the data of the second service, the terminal device sends the first HARQ information to the network device in the first time unit, and discards the second HARQ information, or the terminal device sends the second HARQ information to the network device in the second time unit, and discards the first HARQ information.

Figure 11:
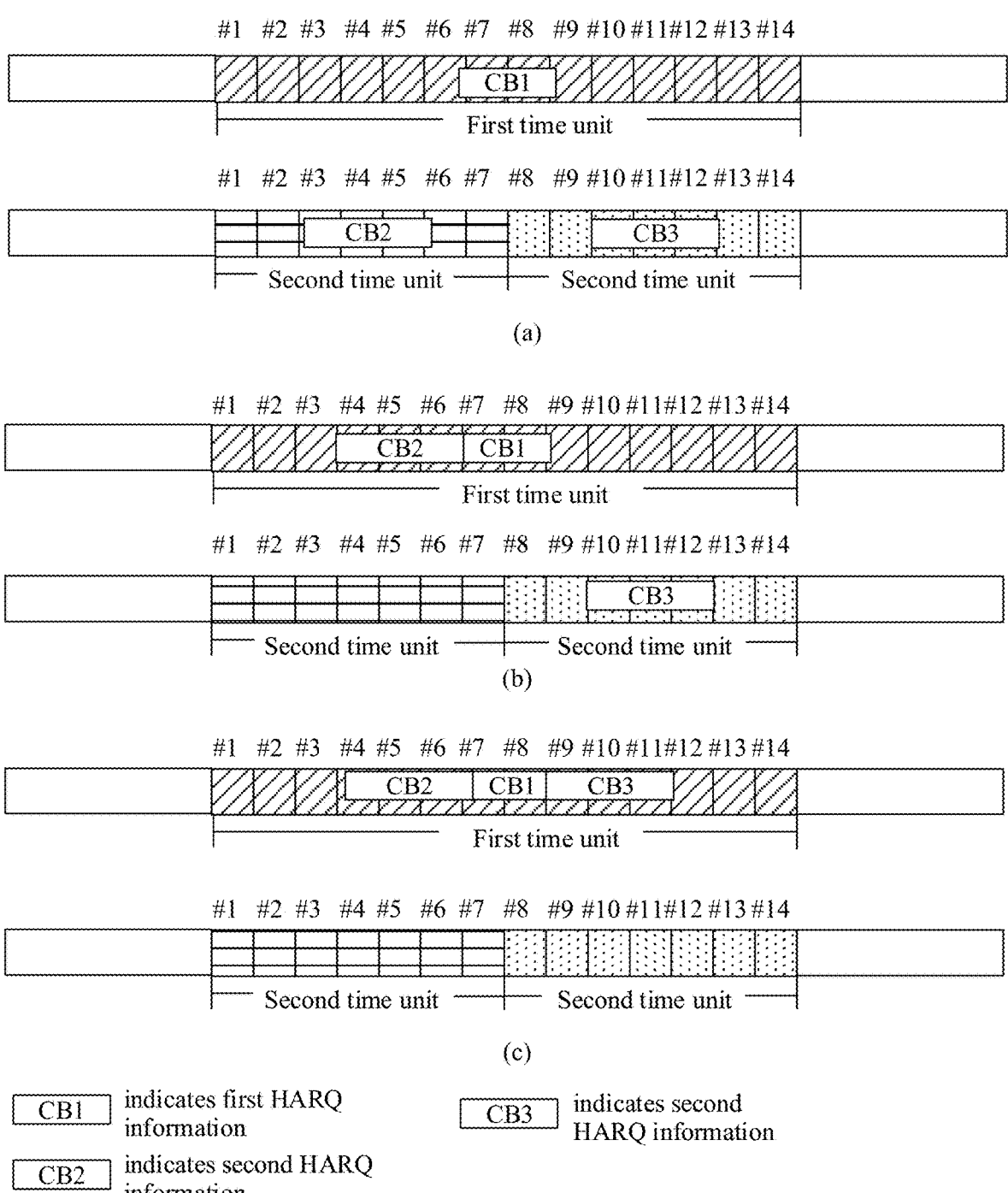
FIG. 11 is another schematic diagram of sending HARQ information according to an embodiment of this application.

In a possible implementation, if the first time unit overlaps at least two second time units, each second time unit corresponds to one piece of second HARQ information. Specifically, each second time unit corresponds to one piece of second HARQ information, that is, a quantity of pieces of second HARQ information is equal to a quantity of second time units, and the second time units are in a one-to-one correspondence with the second HARQ information, as shown in (a) in FIG. 11. It is assumed that the first time unit overlaps two second time units, the first PUCCH configuration information corresponds to unicast, and the second PUCCH configuration information corresponds to multicast. That is, the first time unit corresponds to unicast, the second time unit corresponds to multicast, and the two second time units are referred to as a unit 1 and a unit 2, where the unit 1 and the unit 2 correspond to two pieces of second HARQ information: CB2 and CB3. The CB2 and the CB3 are different feedback information with varying content. The CB2 and the CB3 correspond to HARQ information of a same multicast service. The granularity of the second time unit may be a subslot (subslot), and may include two or seven symbols. In this embodiment of this application, an example in which the granularity of the second time unit is a subslot (subslot) and includes seven symbols is used for description. On the foregoing premise, the following two cases may be included.

(1) The terminal device sends the first HARQ information to the network device, and discards the at least two pieces of second HARQ information; or sends the at least one of at least two pieces of second HARQ information to the network device, and discards the first HARQ information.

Specifically, that the terminal device sends at least one of at least two pieces of second HARQ information to the network device means that the terminal device sends the at least one of the at least two pieces of second HARQ information to the network device, and discards other second HARQ information in the at least two pieces of second HARQ information other than the at least one of the at least two pieces of second HARQ information. For example, assuming that there are two pieces of second HARQ information, which are information 1 and information 2, the information 1 is sent to the network device, and the information 2 is discarded; or the information 2 is sent to the network device, and the information 1 is discarded.

Figures 8, 9:
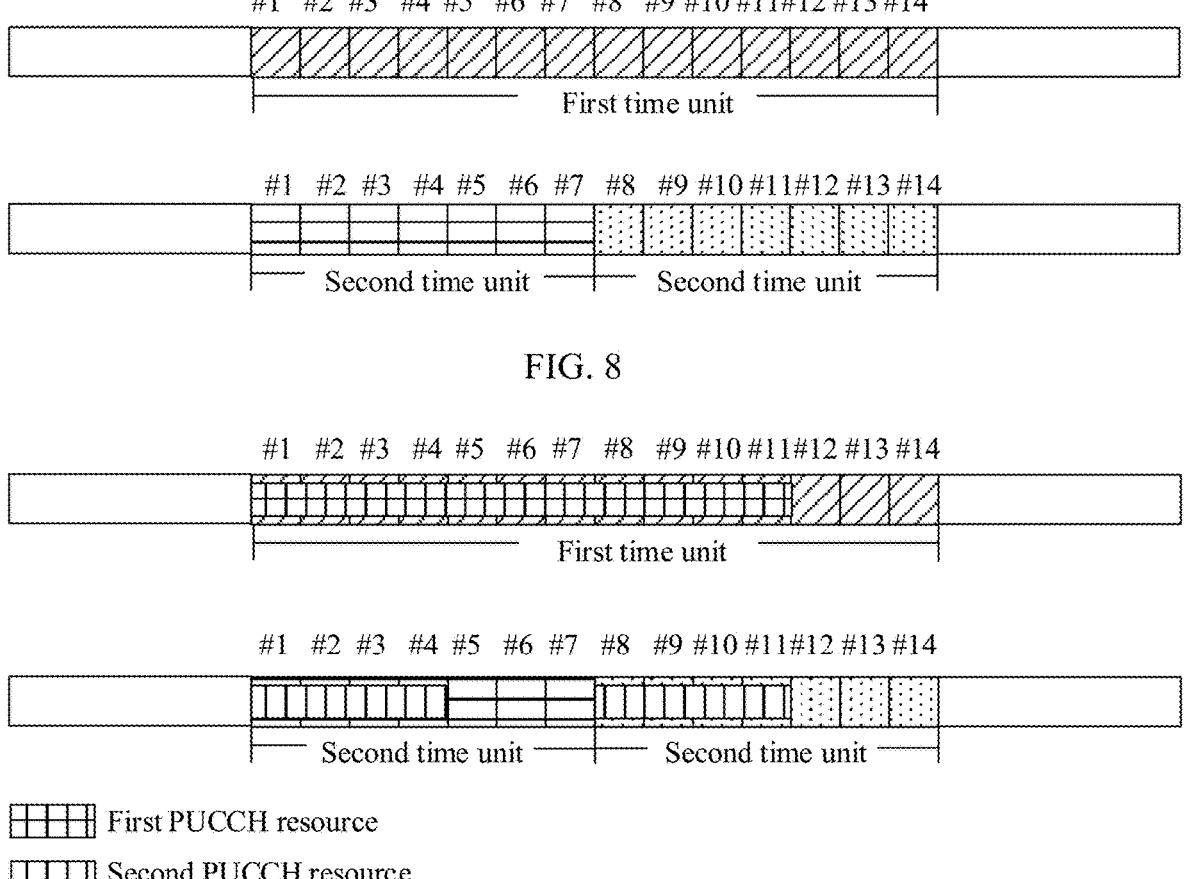
FIG. 8 is a schematic diagram in which a first time unit overlaps two second time units according to an embodiment of this application.
FIG. 9 is a schematic diagram in which a first PUCCH resource overlaps two second PUCCH resources according to an embodiment of this application.

In an example, as shown in FIG. 8, it is assumed that the first time unit overlaps two second time units, the first HARQ information corresponding to the first time unit is a codebook 1, and second HARQ information corresponding to the two second time units is a codebook 2 and a codebook 3, where the codebook 2 corresponds to one second time unit, and the codebook 3 corresponds to the other second time unit. In this case, the terminal device may send the codebook 1 to the network device, and discard the codebook 2 and the codebook 3; or the terminal device may send the codebook 2 and the codebook 3 to the network device, and discard the codebook 1; or the terminal device sends the codebook 2 to the network device, and discards the codebook 1 and the codebook 3; or the terminal device sends the codebook 3 to the network device, and discards the codebook 1 and the codebook 2.

(2) The terminal device sends the first HARQ information to the network device, and discards at least two pieces of second HARQ information in the first time unit; or sends, to the network device, at least one of at least two pieces of second HARQ information corresponding to at least one second time unit, and discards the first HARQ information in the at least one second time unit.

Specifically, sending at least one of the at least two pieces of second HARQ information corresponding to the at least one second time unit means discarding second HARQ information of the at least two pieces of second HARQ information other than the at least one of the at least two pieces of second HARQ information corresponding to the at least one second time unit.

Specifically, if the first time unit includes the first PUCCH resource, the at least two second time units include at least two second PUCCH resources, and each second time unit corresponds to one second PUCCH resource, the terminal device may send the first HARQ information to the network device on the first PUCCH resource, and discard the at least two pieces of second HARQ information; or sends, to the network device on the at least one second PUCCH resource, at least one of the at least two pieces of second HARQ information corresponding to the at least one second PUCCH resource, and discard the first HARQ information. The first PUCCH resource may be based on the first PUCCH configuration information, and the at least two second PUCCH resources may be based on the second PUCCH configuration information.

In an example, as shown in FIG. 8, it is assumed that the first time unit overlaps two second time units, the first HARQ information corresponding to the first time unit is a codebook 1, second HARQ information corresponding to the two second time units is a codebook 2 and a codebook 3, the codebook 2 corresponds to one second time unit, the time unit may be referred to as a unit 2, the codebook 3 corresponds to the other second time unit, and the other time unit may be referred to as a unit 3. In this case, the terminal device may send the codebook 1 to the network device in the first time unit, and discards the codebook 2 and the codebook 3. Alternatively, the terminal device may send the codebook 2 to the network device in the unit 2, send the codebook 3 to the network device in the unit 3, and discard the codebook 1. Alternatively, the terminal device sends the codebook 2 to the network device in the unit 2, and discards the codebook 1 and the codebook 3. Alternatively, the terminal device sends the codebook 3 to the network device in the unit 3, and discards the codebook 1 and the codebook 2.

Further, in the case of the first type of overlapping, that the terminal device sends one of the first HARQ information and the second HARQ information to the network device, and discards the other one is specifically as follows.

In a possible implementation, the first PUCCH configuration information includes the first PUCCH resource, the second PUCCH configuration information includes the second PUCCH resource, the first time unit includes the first PUCCH resource, and the second time unit includes the second PUCCH resource; and that the first time unit overlaps the second time unit is that the first PUCCH resource overlaps the second PUCCH resource. That the first time unit includes the first PUCCH resource means that the first time unit includes the time domain resource of the first PUCCH resource, and that the second time unit includes the second PUCCH resource means that the second time unit includes the time domain resource of the second PUCCH resource.

In a possible implementation, if the first PUCCH resource overlaps the second PUCCH resource, that the terminal device sends one of the first HARQ information and the second HARQ information to the network device, and discards the other one includes: The terminal device sends the first HARQ information to the network device on the first PUCCH resource, and discards the second HARQ information; or sends the second HARQ information to the network device on the second PUCCH resource, and discards the first HARQ information. In an example, as shown in (a) in FIG. 7, the first PUCCH resource overlaps the second PUCCH resource. It is assumed that the first PUCCH configuration information corresponds to unicast, the second PUCCH configuration information corresponds to multicast, the granularity of the first time unit is a slot (slot), and the granularity of the second time unit is a subslot (subslot). Because the first HARQ information is the feedback information of the unicast data, and the second HARQ information is the feedback information of the multicast data, the terminal device sends the first HARQ information to the network device on the first PUCCH resource, and discards the second HARQ information; or the terminal device sends the second HARQ information to the network device on the second PUCCH resource, and discards the first HARQ information.

Figure 14:
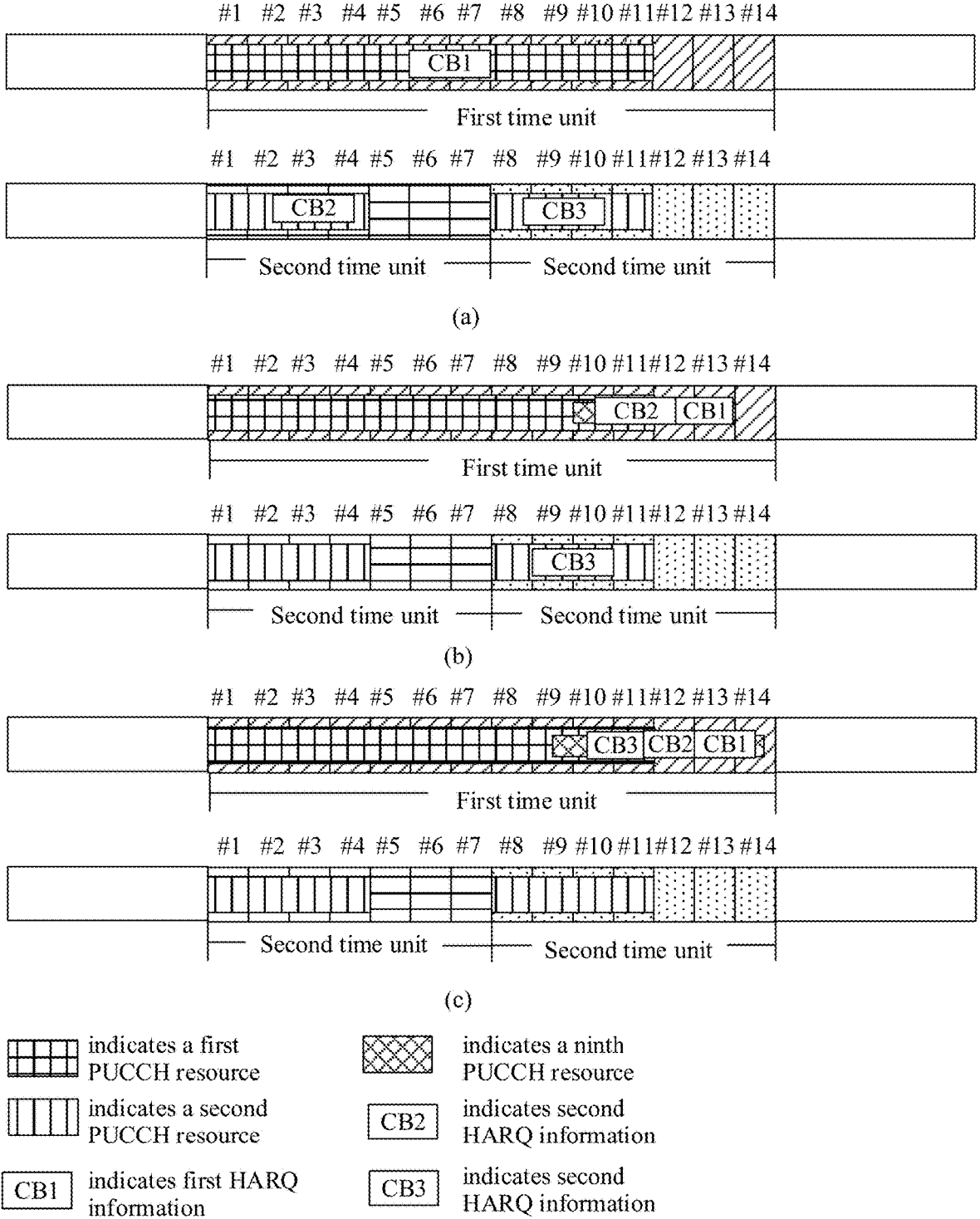
FIG. 14 is another schematic diagram of sending HARQ information according to an embodiment of this application.

In a possible implementation, if the first PUCCH resource overlaps at least two second PUCCH resources, each second PUCCH resource corresponds to one piece of second HARQ information. Specifically, the first PUCCH resource corresponds to the first HARQ information. The at least two second time units include at least two second PUCCH resources, that is, each second time unit includes one second PUCCH resource. Each second PUCCH resource corresponds to one piece of second HARQ information, that is, a quantity of second HARQ information is equal to a quantity of second PUCCH resources, and the second PUCCH resource is in a one-to-one correspondence with the second HARQ information. As shown in (a) in FIG. 14, it is assumed that the first PUCCH resource overlaps two second PUCCH resources, the first PUCCH configuration information corresponds to unicast, and the second PUCCH configuration information corresponds to multicast. That is, the first time unit corresponds to unicast, and the second time unit corresponds to multicast. The first PUCCH resource corresponds to unicast, and the second PUCCH resource corresponds to multicast. The two second PUCCH resources are referred to as a resource 1 and a resource 2, where the resource 1 and the resource 2 correspond to two pieces of second HARQ information: CB2 and CB3. The CB2 and the CB3 are different feedback information with varying content. The CB2 and the CB3 correspond to HARQ information of a same multicast service. On this premise, the following two cases may be included.

(1) The terminal device sends the first HARQ information to the network device, and discards the at least two pieces of second HARQ information; or the terminal device sends the at least one of at least two pieces of second HARQ information to the network device, and discards the first HARQ information. Specifically, that the terminal device sends at least one of at least two pieces of second HARQ information to the network device means to send at least one of the at least two pieces of second HARQ information to the network device, and discard other second HARQ information in the at least two pieces of second HARQ information other than the at least one of the at least two pieces of second HARQ information.

In an example, as shown in FIG. 9, it is assumed that the first PUCCH resource overlaps two second PUCCH resources, the first HARQ information corresponding to the first PUCCH resource is a codebook 1, second HARQ information corresponding to the two second PUCCH resources is referred to as a codebook 2 and a codebook 3, where the codebook 2 corresponds to one second PUCCH resource, and the codebook 3 corresponds to the other second PUCCH resource. In this case, the terminal device may send the codebook 1 to the network device, discard the codebook 2 and the codebook 3; or the terminal device may send the codebook 2 and the codebook 3 to the network device, and discard the codebook 1; or the terminal device sends the codebook 2 to the network device, and discards the codebook 1 and the codebook 3; or the terminal device sends the codebook 3 to the network device, and discards the codebook 1 and the codebook 2.

(2) The terminal device sends the first HARQ information to the network device on the first PUCCH resource, and discards at least two pieces of second HARQ information; or the terminal device sends, on at least one of at least two second PUCCH resources to the network device, second HARQ information corresponding to the at least one second PUCCH resource, and discards the first HARQ information.

Specifically, that the terminal device sends, on at least one of at least two second PUCCH resources to the network device, second HARQ information corresponding to the at least one second PUCCH resource means that the terminal device sends, to the network device, the second HARQ information corresponding to the at least one second PUCCH resource, and discards other second HARQ information corresponding to the other second PUCCH resource other than the at least one second PUCCH resource in the at least two second PUCCH resources.

In an example, as shown in FIG. 9, it is assumed that the first PUCCH resource overlaps two second PUCCH resources, the first HARQ information corresponding to the first PUCCH resource is a codebook 1, second HARQ information corresponding to the two second PUCCH resources is referred to as a codebook 2 and a codebook 3, the codebook 2 corresponds to one second PUCCH resource, the second PUCCH resource may be referred to as a resource 1 for short, the codebook 3 corresponds to the other second PUCCH resource, and the other second PUCCH resource may be referred to as a resource 2 for short. In this case, the terminal device may send the codebook 1 to the network device on the first PUCCH resource, and discard the codebook 2 and the codebook 3. Alternatively, the terminal device may send the codebook 2 to the network device on the resource 1, send and the codebook 3 to the network device on the resource 2, and discard the codebook 1. Alternatively, the terminal device sends the codebook 2 to the network device on the resource 1, and discards the codebook 1 and the codebook 3. Alternatively, the terminal device sends the codebook 3 to the network device on the resource 2, and discards the codebook 1 and the codebook 2.

The first type of overlapping described below is the same as the second type of overlapping described above. Details are not described herein again.

Manner 2:

In Manner 2, in the case of the first type of overlapping, the terminal device concatenates the first HARQ information and the second HARQ information, and sends, to the network device, the HARQ information that is obtained through concatenation and that includes the first HARQ information and the second HARQ information. Further, in the case of the second type of overlapping, the terminal device concatenates the first HARQ information and the second HARQ information; and sends, to the network device, the HARQ information that is obtained through concatenation and that includes the first HARQ information and the second HARQ information.

In the case of the first type of overlapping, that the terminal device concatenates the first HARQ information and the second HARQ information, and sends, to the network device, the HARQ information that is obtained through concatenation and that includes the first HARQ information and the second HARQ information is specifically as follows.

In a possible implementation, if the first time unit overlaps the second time unit, that the terminal device concatenates the first HARQ information and the second HARQ information, and sends, to the network device, the HARQ information that is obtained through concatenation and that includes the first HARQ information and the second HARQ information includes: sending, to the network device in the first time unit or the second time unit, the HARQ information that is obtained through concatenation and that includes the first HARQ information and the second HARQ information.

Specifically, concatenation of the first HARQ information and the second HARQ information may be concatenation of pre-encoded bits of the first HARQ information and the second HARQ information, and then encoding is performed. Alternatively, concatenation of the first HARQ information and the second HARQ information may be direct splicing, combination, or the like of the first HARQ information and the second HARQ information.

Specifically, the terminal device may send, to the network device on a third PUCCH resource or a fourth PUCCH resource, the HARQ information that is obtained through concatenation and that includes the first HARQ information and the second HARQ information. The first time unit includes a time domain resource of the third PUCCH resource, the second time unit includes a time domain resource of the fourth PUCCH resource, the third PUCCH resource may be based on the first PUCCH configuration information, and the fourth PUCCH resource may be based on the second PUCCH configuration information.

Figure 10:
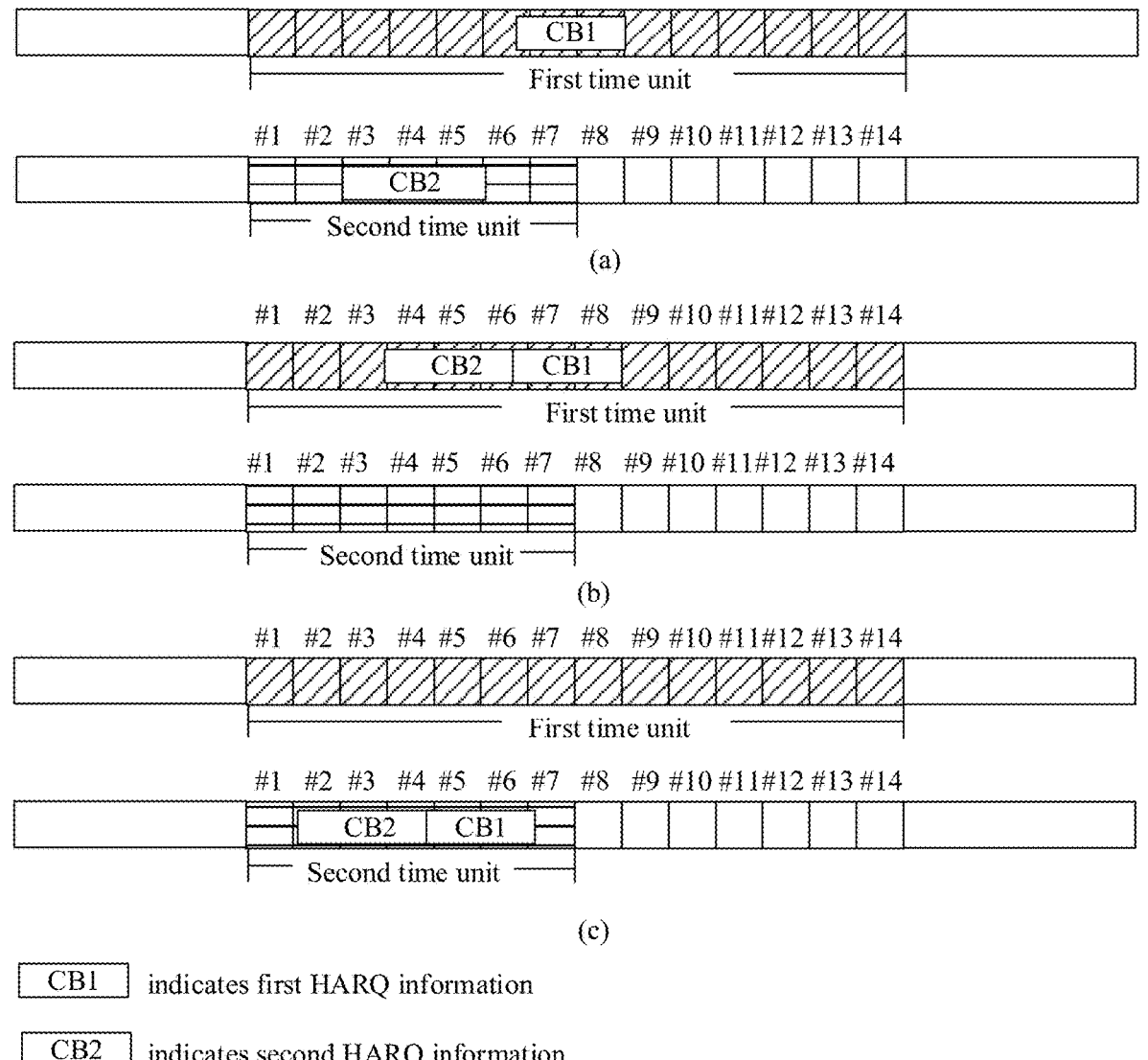
FIG. 10 is a schematic diagram of sending HARQ information according to an embodiment of this application.

In an example, as shown in FIG. 6, the first time unit overlaps the second time unit. A correspondence between a time unit and HARQ information is specifically shown in (a) in FIG. 10. The first time unit corresponds to the first HARQ information, and the second time unit corresponds to the second HARQ information. The terminal device concatenates the first HARQ information and the second HARQ information, and sends, to the network device in the first time unit, the HARQ information that is obtained through concatenation and that includes the first HARQ information and the second HARQ information, as shown in (b) in FIG. 10. Alternatively, the terminal device concatenates the first HARQ information and the second HARQ information, and sends, to the network device in the second time unit, the HARQ information that is obtained through concatenation and that includes the first HARQ information and the second HARQ information, as shown in (c) in FIG. 10.

In a possible implementation, if the first time unit overlaps at least two second time units, and each of the second time units corresponds to one piece of second HARQ information, the first HARQ information is concatenated with at least one piece of second HARQ information. Specifically, each second time unit corresponds to one piece of second HARQ information, that is, a quantity of pieces of second HARQ information is equal to a quantity of second time units, and the second time units are in a one-to-one correspondence with the second HARQ information, as shown in (a) in FIG. 11. It is assumed that the first time unit overlaps two second time units, the first PUCCH configuration information corresponds to unicast, and the second PUCCH configuration information corresponds to multicast. That is, the first time unit corresponds to unicast, the second time unit corresponds to multicast, and the two second time units are referred to as a unit 1 and a unit 2, where the unit 1 and the unit 2 correspond to two pieces of second HARQ information: CB2 and CB3. The CB2 and the CB3 are different feedback information with varying content. The CB2 and the CB3 correspond to HARQ information of a same multicast service. The granularity of the second time unit may be a subslot (subslot), and may include two or seven symbols. In this embodiment of this application, an example in which the granularity of the second time unit is a subslot (subslot) and includes seven symbols is used for description. Concatenation of the first HARQ information and the at least one piece of second HARQ information may include that concatenation of the first HARQ information and all the second HARQ information. On the foregoing premise, the following two cases may be included.

(1) The terminal device sends, to the network device in the first time unit, HARQ information that is obtained through concatenation and that includes the first HARQ information and the at least one piece of second HARQ information.

Specifically, the HARQ information that is obtained through concatenation and that includes the first HARQ information and the at least one piece of second HARQ information may be information that is obtained through concatenation and that includes the first HARQ information and all the second HARQ information.

Specifically, the terminal device may further send any other piece of second HARQ information to the network device in a second time unit corresponding to the other second HARQ information. The other second HARQ information is second HARQ information in the at least one piece of second HARQ information other than concatenated second HARQ information.

Specifically, that the terminal device sends, to the network device in the first time unit, HARQ information that is obtained through concatenation and that includes the first HARQ information and the at least one piece of second HARQ information may mean that the terminal device may send, to the network device on a fifth PUCCH resource, the HARQ information that is obtained through concatenation and that includes the first HARQ information and the at least one piece of second HARQ information, where the first time unit includes a time domain resource of the fifth PUCCH resource, and the fifth PUCCH resource may be based on the first PUCCH configuration information.

In an example, as shown in FIG. 8, it is assumed that the first time unit overlaps two second time units. A correspondence between a time unit and HARQ information is specifically shown in (a) in FIG. 11. The first time unit corresponds to the first HARQ information, and the first HARQ information may be referred to as CB1 for short. The first time unit is referred to as a unit 1 for short. The two second time units respectively correspond to two pieces of second HARQ information, each second time unit corresponds to one piece of second HARQ information, and the two second time units are referred to as a unit 2 and a unit 3, where the second HARQ information corresponding to the unit 2 may be referred to as CB2 for short, and the second HARQ information corresponding to the unit 3 may be referred to as CB3 for short. As shown in (b) in FIG. 11, it is assumed that the terminal device may concatenate the CB1 and the CB2, and then send, to the network device in the unit 1, HARQ information that is obtained through concatenation and that includes the CB1 and the CB2. The terminal device may send the CB3 to the network device in the unit 3. As shown in (c) in FIG. 11, it is assumed that the terminal device may concatenate the CB1, the CB2, and the CB3, and then send, to the network device in the unit 1, HARQ information that is obtained through concatenation and that includes the CB1, the CB2, and the CB3.

(2) The terminal device sends, to the network device in a second time unit corresponding to any piece of concatenated second HARQ information, HARQ information that is obtained through concatenation and that includes the first HARQ information and the at least one piece of second HARQ information.

Specifically, the terminal device may alternatively send, in a second time unit corresponding to any second HARQ information other than the concatenated second HARQ information, the second HARQ information other than the concatenated second HARQ information to the network device.

Specifically, that the terminal device sends, to the network device in a second time unit corresponding to any piece of concatenated second HARQ information, HARQ information that is obtained through concatenation and that includes the first HARQ information and the at least one piece of second HARQ information may mean that the terminal device may send, to the network device on a sixth PUCCH resource included in the second time unit corresponding to any piece of concatenated second HARQ information, the HARQ information that is obtained through concatenation and that includes the first HARQ information and the at least one piece of second HARQ information, where the second time unit includes a time domain resource of the sixth PUCCH resource, and the sixth PUCCH resource may be based on the second PUCCH configuration information.

Figure 12:
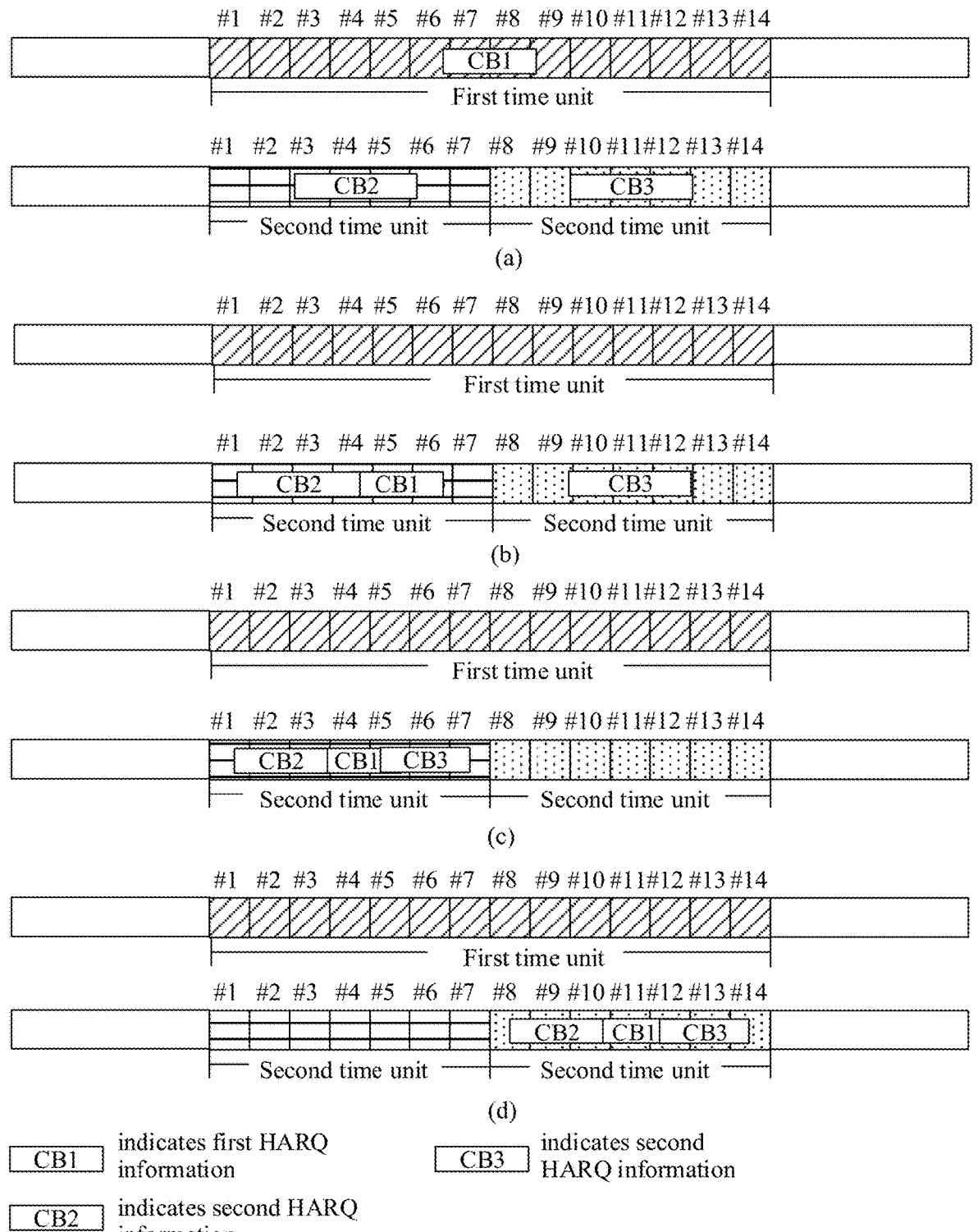
FIG. 12 is another schematic diagram of sending HARQ information according to an embodiment of this application.

In an example, as shown in FIG. 8, it is assumed that the first time unit overlaps two second time units. A correspondence between a time unit and HARQ information is specifically shown in (a) in FIG. 12. The first time unit corresponds to the first HARQ information, the first HARQ information may be referred to as CB1 for short, and the first time unit is referred to as a unit 1 for short. The two second time units respectively correspond to two pieces of second HARQ information, each second time unit corresponds to one piece of second HARQ information, and the two second time units are referred to as a unit 2 and a unit 3, where the second HARQ information corresponding to the unit 2 may be referred to as CB2 for short, and the second HARQ information corresponding to the unit 3 may be referred to as CB3 for short. As shown in (b) in FIG. 12, it is assumed that the terminal device may concatenate the CB1 and the CB2, and a second time unit corresponding to the concatenated second HARQ information is the unit 2. Then, HARQ information that is obtained through concatenation and that includes the CB1 and the CB2 is sent to the network device in the unit 2. The terminal device may send the CB3 to the network device in the unit 3. As shown in (c) in FIG. 12, it is assumed that the terminal device may concatenate the CB1, the CB2, and the CB3. The concatenated second HARQ information is the CB2, and a second time unit corresponding to the concatenated second HARQ information may be the unit 2. Then, HARQ information that is obtained through concatenation and that includes the CB1, the CB2, and the CB3 is sent to the network device in the unit 2. As shown in (d) in FIG. 12, it is assumed that the terminal device may concatenate the CB1, the CB2, and the CB3, the concatenated second HARQ information is the CB3, and a second time unit corresponding to the concatenated second HARQ information may be the unit 3. Then, HARQ information that is obtained through concatenation and that includes the CB1, the CB2, and the CB3 is sent to the network device in the unit 3.

Further, in the case of the second type of overlapping, the terminal device concatenates the first HARQ information and the second HARQ information, and sends, to the network device, the HARQ information that is obtained through concatenation and that includes the first HARQ information and the second HARQ information.

In a possible implementation, the first PUCCH configuration information includes the first PUCCH resource, the second PUCCH configuration information includes the second PUCCH resource, the first time unit includes the first PUCCH resource, and the second time unit includes the second PUCCH resource; and that the first time unit overlaps the second time unit is that the first PUCCH resource overlaps the second PUCCH resource. That the first time unit includes the first PUCCH resource means that the first time unit includes the time domain resource of the first PUCCH resource, and that the second time unit includes the second PUCCH resource means that the second time unit includes the time domain resource of the second PUCCH resource.

In a possible implementation, if the first PUCCH resource overlaps a second PUCCH resource, that the terminal device concatenates the first HARQ information and the second HARQ information, and sends, to the network device, the HARQ information that is obtained through concatenation and that includes the first HARQ information and the second HARQ information includes: sending, to the network device on a seventh PUCCH resource or an eighth PUCCH resource, the HARQ information that is obtained through concatenation and that includes the first HARQ information and the second HARQ information, where the seventh PUCCH resource is based on the first PUCCH configuration information, and the eighth PUCCH resource is based on the second PUCCH configuration information. The first time unit includes a time domain resource of the seventh PUCCH resource, and the second time unit includes a time domain resource of the eighth PUCCH resource.

Figure 13:
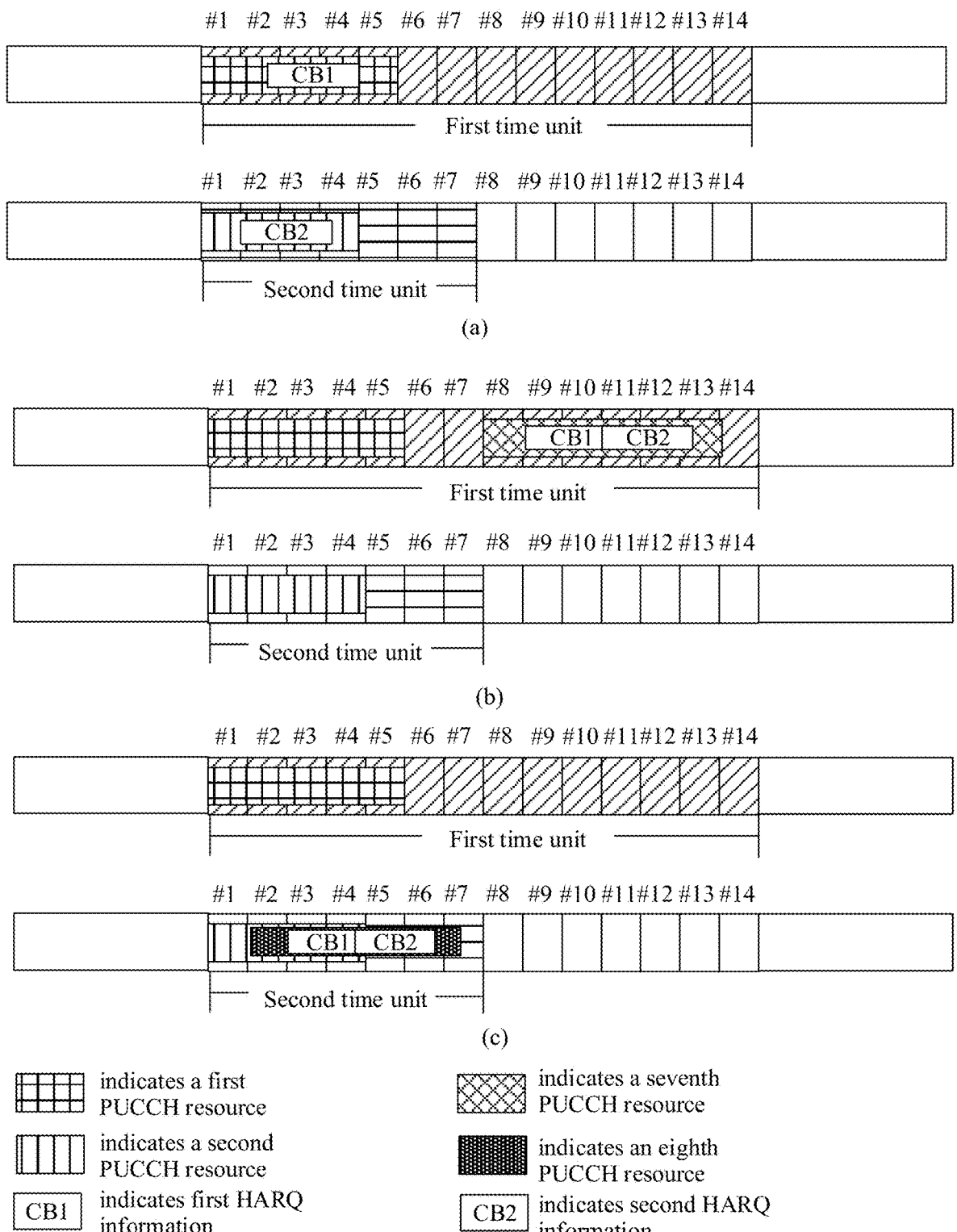
FIG. 13 is another schematic diagram of sending HARQ information according to an embodiment of this application.

In an example, as shown in (a) in FIG. 7, the first PUCCH resource overlaps the second PUCCH resource. A correspondence between a PUCCH resource and HARQ information is specifically shown in (a) in FIG. 13. The first PUCCH resource corresponds to the first HARQ information, and the second PUCCH resource corresponds to the second HARQ information. The terminal device concatenates the first HARQ information and the second HARQ information, and sends, to the network device on the seventh PUCCH resource, the HARQ information that is obtained through concatenation and that includes the first HARQ information and the second HARQ information. Details are specifically shown in (b) in FIG. 13. Alternatively, the terminal device concatenates the first HARQ information and the second HARQ information, and sends, to the network device on the eighth PUCCH resource, the HARQ information that is obtained through concatenation and that includes the first HARQ information and the second HARQ information. Details are specifically shown in (c) in FIG. 13.

In a possible implementation, if the first PUCCH resource overlaps at least two second PUCCH resources, and each second PUCCH resource corresponds to one piece of second HARQ information, the first HARQ information is concatenated with the at least one piece of second HARQ information. Specifically, the first PUCCH resource corresponds to the first HARQ information. The at least two second time units include at least two second PUCCH resources, that is, each second time unit includes one second PUCCH resource. Each second PUCCH resource corresponds to one piece of second HARQ information, that is, a quantity of second HARQ information is equal to a quantity of second PUCCH resources, and the second PUCCH resource is in a one-to-one correspondence with the second HARQ information. As shown in (a) in FIG. 14, it is assumed that the first PUCCH resource overlaps two second PUCCH resources, the first PUCCH configuration information corresponds to unicast, and the second PUCCH configuration information corresponds to multicast. That is, the first time unit corresponds to unicast, and the second time unit corresponds to multicast. The first PUCCH resource corresponds to unicast, and the second PUCCH resource corresponds to multicast. The two second PUCCH resources are referred to as a resource 1 and a resource 2, where the resource 1 and the resource 2 correspond to two pieces of second HARQ information: CB2 and CB3. The CB2 and the CB3 are different feedback information with varying content. The CB2 and the CB3 correspond to HARQ information of a same multicast service. On this premise, the following two cases may be included.

(1) The terminal device sends, to the network device on a ninth PUCCH resource, HARQ information that is obtained through concatenation and that includes the first HARQ information and the at least one piece of second HARQ information. Specifically, the ninth PUCCH resource is based on the first PUCCH configuration information. The first time unit includes a time domain resource of the ninth PUCCH resource.

Specifically, the HARQ information that is obtained through concatenation and that includes the first HARQ information and the at least one piece of second HARQ information may be HARQ information that is obtained through concatenation and that includes the first HARQ information and all the second HARQ information.

Specifically, the terminal device may further send other second HARQ information in the at least two pieces of second HARQ information other than the concatenated at least one piece of second HARQ information to the network device on another second PUCCH resource, where the another second PUCCH resource is in the at least two second PUCCH resources other than the at least one second PUCCH resource and that corresponds to the other second HARQ information in the at least two pieces of second HARQ information other than the concatenated at least one piece of second HARQ information.

In an example, as shown in FIG. 9, it is assumed that the first PUCCH resource overlaps two second PUCCH resources. A correspondence between a PUCCH resource and HARQ information is specifically shown in (a) in FIG. 14. The first PUCCH resource corresponds to the first HARQ information, the first HARQ information may be referred to as CB1 for short, and the first PUCCH resource may be referred to as a resource 1. The two second PUCCH resources respectively correspond to two pieces of second HARQ information, each second PUCCH resource corresponds to one piece of second HARQ information, and the two second PUCCH resources are respectively referred to as a resource 2 and a resource 3, where the second HARQ information corresponding to the resource 2 may be referred to as CB2 for short, and the second HARQ information corresponding to the resource 3 may be referred to as CB3 for short. As shown in (b) in FIG. 14, it is assumed that the terminal device may concatenate the CB1 and the CB2, and then send, to the network device on the ninth PUCCH resource, HARQ information that is obtained through concatenation and that includes the CB1 and the CB2. The terminal device may send the CB3 to the network device on the resource 3. As shown in (c) in FIG. 14, it is assumed that the terminal device may concatenate the CB1, the CB2, and the CB3, and then send, to the network device on the ninth PUCCH resource, HARQ information that is obtained through concatenation and that includes the CB1, the CB2, and the CB3.

(2) The terminal device sends, to the network device on a tenth PUCCH resource included in a second time unit corresponding to any piece of concatenated second HARQ information, HARQ information that is obtained through concatenation and that includes the first HARQ information and the at least one piece of second HARQ information.

Specifically, the tenth PUCCH resource is based on the second PUCCH configuration information, and the second time unit corresponding to any piece of concatenated second HARQ information includes a time domain resource of the tenth PUCCH resource. The terminal device may further send other second HARQ information in the at least two pieces of second HARQ information other than the concatenated at least one piece of second HARQ information to the network device on another second PUCCH resource, where the another second PUCCH resource is in the at least two second PUCCH resources other than the at least one second PUCCH resource and that corresponds to the other second HARQ information in the at least two pieces of second HARQ information other than the concatenated at least one piece of second HARQ information.

Figure 15:
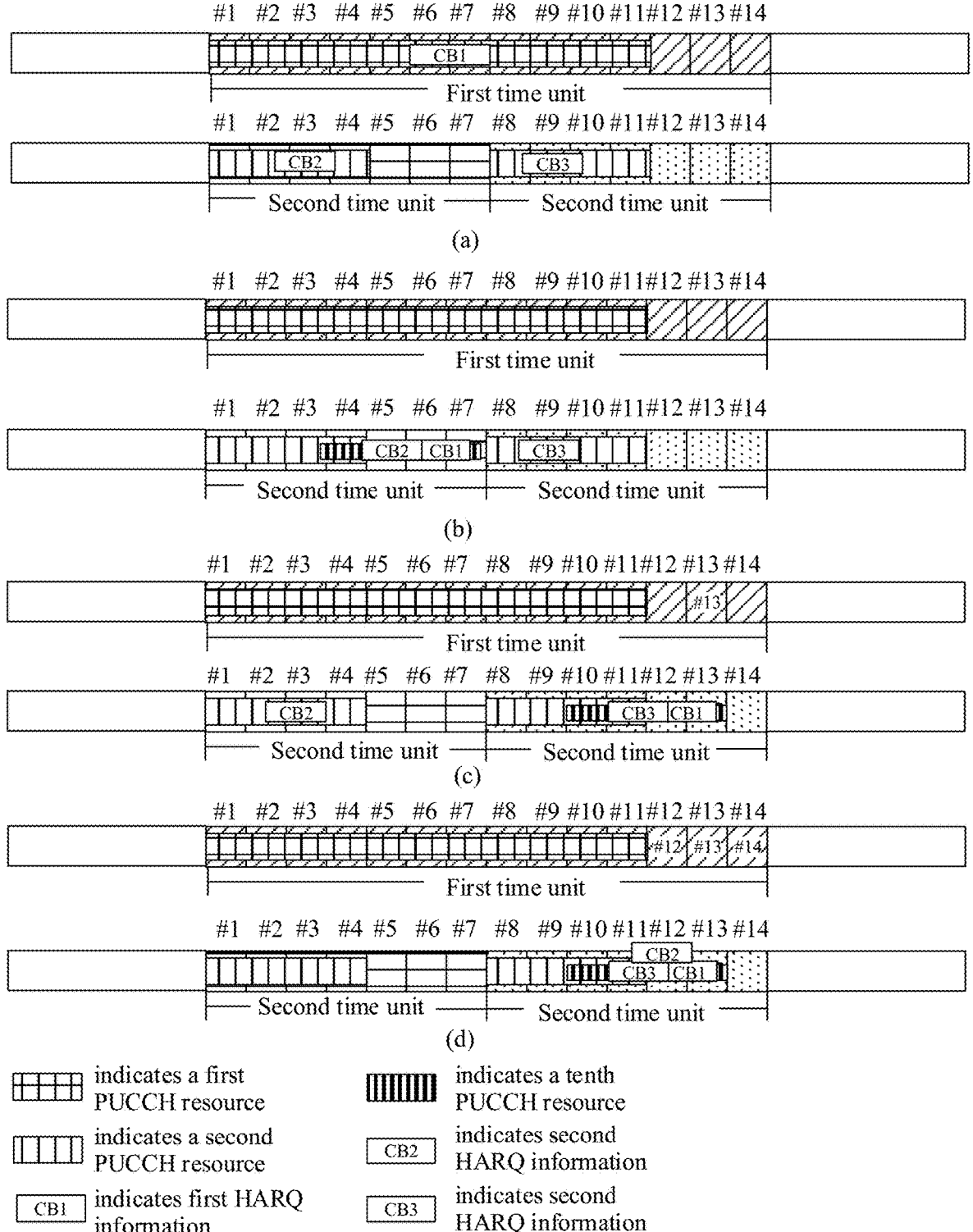
FIG. 15 is another schematic diagram of sending HARQ information according to an embodiment of this application.

In an example, as shown in FIG. 9, it is assumed that the first PUCCH resource overlaps two second PUCCH resources. A correspondence between a PUCCH resource and HARQ information is specifically shown in (a) in FIG. 15. The first PUCCH resource corresponds to the first HARQ information, the first HARQ information may be referred to as CB1 for short, and the first PUCCH resource may be referred to as a resource 1. The two second PUCCH resources respectively correspond to two pieces of second HARQ information, each second PUCCH resource corresponds to one piece of second HARQ information, and the two second PUCCH resources are respectively referred to as a resource 2 and a resource 3, where the second HARQ information corresponding to the resource 2 may be referred to as CB2 for short, and the second HARQ information corresponding to the resource 3 may be referred to as CB3 for short. As shown in (b) in FIG. 15, it is assumed that the terminal device may concatenate the CB1 and the CB2, and then send, to the network device on the tenth PUCCH resource, HARQ information that is obtained through concatenation and that includes the CB1 and the CB2. The terminal device may send the CB3 to the network device on the resource 3. As shown in (c) in FIG. 15, it is assumed that the terminal device may concatenate the CB1 and the CB3, and then send, to the network device on the tenth PUCCH resource, HARQ information that is obtained through concatenation and that includes the CB1 and the CB3. The terminal device may send the CB2 to the network device on the resource 2. As shown in (d) in FIG. 15, it is assumed that the terminal device may concatenate the CB1, the CB2, and the CB3, and then send, to the network device on the tenth PUCCH resource, HARQ information that is obtained through concatenation and that includes the CB1, the CB2, and the CB3.

In the method described in FIG. 5, when the network device configures two pieces of configuration information for the terminal device, the two pieces of configuration information respectively correspond to the first service and the second service, the first service is one of unicast and multicast, the second service is the other one of unicast and multicast, and the priority of the first HARQ information is the same as the priority of the second HARQ information, if the first time unit overlaps the second time unit, one of the first HARQ information and the second HARQ information is sent to the network device, and the other one is discarded, or the first HARQ information and the second HARQ information are concatenated, and the HARQ information that is obtained through concatenation and that includes the first HARQ information and the second HARQ information is sent to the network device. In this way, the problem of how to send the first HARQ information and the second HARQ information in the occurrence of a resource conflict can be resolved, thereby avoiding impact on feedback of the HARQ information due to the resource conflict, and improving reliability of feedback of the HARQ information.

Figure 16:
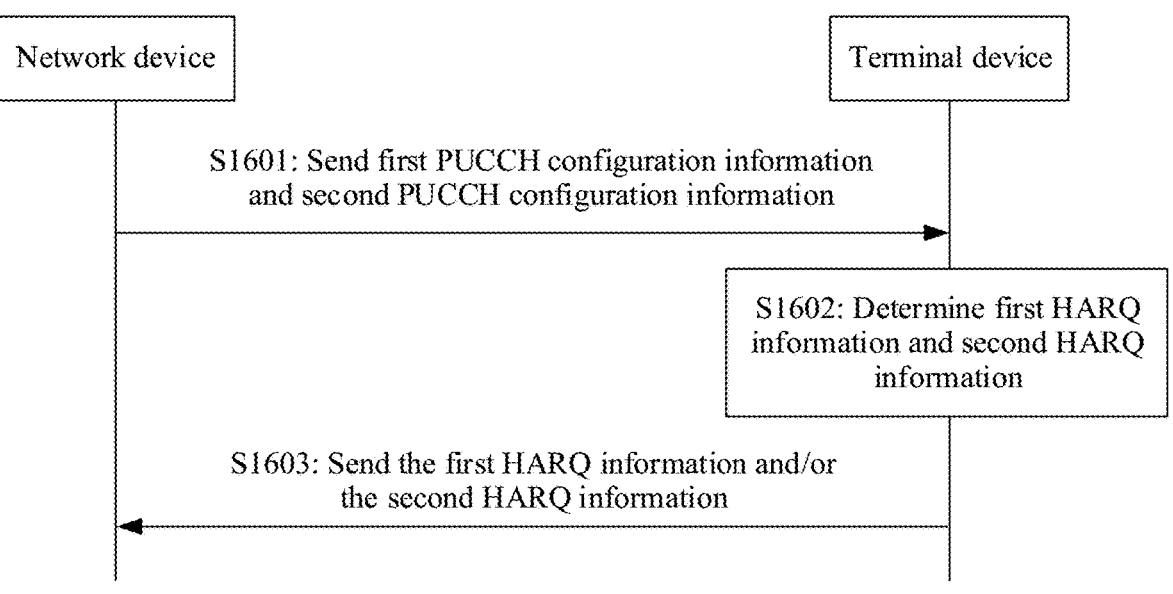
FIG. 16 is a flowchart of an information sending or receiving method according to an embodiment of this application.

FIG. 16 shows another information sending or receiving method according to an embodiment of this application. The method includes but is not limited to the following steps.

Step S1601: A network device sends first PUCCH configuration information and second PUCCH configuration information to a terminal device.

Correspondingly, the terminal device receives the first PUCCH configuration information and the second PUCCH configuration information from the network device.

Specifically, the first PUCCH configuration information and the second PUCCH configuration information may be included in one piece of RRC signaling, or may be separately included in different pieces of RRC signaling. The first PUCCH configuration information corresponds to a first service, and the second PUCCH configuration information corresponds to a second service. For example, the first PUCCH configuration information is used to configure sending of the first service, and the second PUCCH configuration information is used to configure sending of the second service. The first service is one of unicast and multicast, and the second service is the other one of unicast and multicast. For example, the first PUCCH configuration information corresponds to unicast, and the second PUCCH configuration information corresponds to multicast. In the subsequent embodiments, an example in which the first service is unicast and the second service is multicast is used for description.

Specifically, the first PUCCH configuration information indicates a granularity of a first time unit, and the second PUCCH configuration information indicates a granularity of a second time unit.

Specifically, in an implementation, if the terminal device does not expect the granularity of the first time unit to be different from the granularity of the second time unit, the granularity of the first time unit indicated by the first PUCCH configuration information is the same as the granularity of the second time unit indicated by the second PUCCH configuration information. That is, when the terminal device does not expect the granularity of the first time unit to be different from the granularity of the second time unit, the granularity of the first time unit and the granularity of the second time unit that are respectively indicated by the first PUCCH configuration information and the second PUCCH configuration information sent by the network device to the terminal device are definitely the same. That is, because the terminal device does not expect the granularity of the first time unit to be different from the granularity of the second time unit, the granularity of the first time unit indicated by the first PUCCH configuration information is the same as the granularity of the second time unit indicated by the second PUCCH configuration information. That the terminal device does not expect the granularity of the first time unit to be different from the granularity of the second time unit may alternatively be described as that the terminal device does not expect to be configured with: the granularity of the first time unit is different from the granularity of the second time unit. In other words, the network device is required not to configure the granularities to be different, that is, the granularities can only be configured to be the same. For example, the granularities are slot-level granularities, the granularities are 7-symbol-level sub slot granularities, or the granularities are 2-symbol-level sub slot granularities.

When the first time unit does not overlap the second time unit, the terminal device sends first HARQ information to the network device in the first time unit, and the terminal device sends second HARQ information to the network device in the second time unit. When the first time unit overlaps (has a same granularity as, that is, completely overlaps) the second time unit, the terminal device sends first HARQ information and second HARQ information to the network device in the first time unit or the second time unit. In this case, the first time unit and the second time unit are the same. In addition, the first HARQ information and the second HARQ information are sent on a PUCCH resource that is based on the first PUCCH configuration information or the second PUCCH configuration information, that is, after the first HARQ information and the second HARQ information are jointly coded or independently coded, encoded information including the first HARQ information and the second HARQ information is sent on the determined PUCCH resource.

Specifically, in another implementation, when the granularity of the first time unit is different from the granularity of the second time unit, if the terminal device does not expect the first time unit to overlap the second time unit, the first time unit does not overlap the second time unit. That is, when the granularity of the first time unit is different from the granularity of the second time unit, if the terminal device does not expect the first time unit to overlap the second time unit, the first time unit definitely does not overlap the second time unit. That is, when the granularity of the first time unit is different from the granularity of the second time unit, the first time unit does not overlap the second time unit because the terminal device does not expect the first time unit to overlap the second time unit. Alternatively, it may be understood that in this implementation, the network device may configure, for the terminal device, the first time unit and the second time unit to have different granularities. For example, the granularity of the first time unit is a slot-level granularity, and the granularity of the second time unit is a sub slot-level granularity. However, in the foregoing configuration of different granularities, the terminal device does not expect the network device to schedule or indicate the terminal device to feed back the first HARQ information and the second HARQ information in the first time unit and the second time unit that overlap in time domain. That is, the network device is required not to indicate or schedule the first time unit to overlap the second time unit, that is, indicate or schedule the first time unit not to overlap the second time unit. That the terminal device does not expect the first time unit to overlap the second time unit may alternatively be described as that the terminal device does not expect to be scheduled or indicated as the following result: The first time unit overlaps the second time unit.

Optionally, in another implementation, when the granularity of the first time unit is different from the granularity of the second time unit, the terminal device does not expect the first time unit to separately overlap two second time units, or does not expect the second time unit to separately overlap two first time units. For example, the first time unit is a slot (including 14 symbols), the two second time units are two consecutive subslots each including seven symbols, and the slot separately overlaps the two subslots. The terminal device does not expect a result of such scheduling or indication.

When the first time unit does not overlap the second time unit, the terminal device sends first HARQ information to the network device in the first time unit, and the terminal device sends second HARQ information to the network device in the second time unit, where a first PUCCH resource for sending the first HARQ information is based on the first PUCCH configuration information, and the second PUCCH resource for sending the second HARQ information is based on the second PUCCH configuration information.

Step S1602: The terminal device determines first HARQ information and second HARQ information.

Specifically, the first HARQ information is feedback information of data of the first service, and the second HARQ information is feedback information of data of the second service. The first service is one of unicast and multicast, and the second service is the other one of unicast and multicast. For example, the first HARQ information is feedback information of unicast data, and the second HARQ information is feedback information of multicast data.

Specifically, a priority of the first HARQ information is the same as a priority of the second HARQ information. Optionally, that the priority of the first HARQ information is the same as the priority of the second HARQ information may be determined by receiving information from the network device, where the information may be DCI.

Specifically, when the priority of the first HARQ information is the same as the priority of the second HARQ information, the terminal device does not expect the granularity of the first time unit to be different from the granularity of the second time unit.

Specifically, when the priority of the HARQ information is the same as the priority of the second HARQ information, and the granularity of the first time unit is different from the granularity of the second time unit, the terminal device does not expect the first time unit to overlap the second time unit.

Specifically, when the priority of the HARQ information is the same as priorities of at least two pieces of second HARQ information, and the granularity of the first time unit is different from the granularity of the second time unit, the terminal device does not expect the first time unit to overlap at least two second time units. The at least two second time units correspond to the at least two pieces of second HARQ information, and each time unit corresponds to one piece of second HARQ information.

Step S1603: The terminal device sends the first HARQ information and/or the second HARQ information to the network device.

Correspondingly, the network device receives the first HARQ information and/or the second HARQ information from the terminal device.

Specifically, when the first time unit overlaps the second time unit, for sending the first HARQ information and/or the second HARQ information to the network device by the terminal device, refer to the descriptions in FIG. 5. Details are not described herein again.

In the method shown in FIG. 16, when the network device configures two pieces of configuration information for the terminal device, the two pieces of configuration information respectively correspond to the first service and the second service, the first service is one of unicast and multicast, the second service is the other one of unicast and multicast, and the priority of the first HARQ information is the same as the priority of the second HARQ information, the granularity of the first time unit is the same as the granularity of the second time unit, and/or the first time unit does not overlap the second time unit. In this way, occurrence of resource conflict behavior can be avoided, and feedback reliability of the HARQ information is improved.

The methods in embodiments of this application are described above in detail, and apparatuses in embodiments of this application are provided below.

Figure 17:
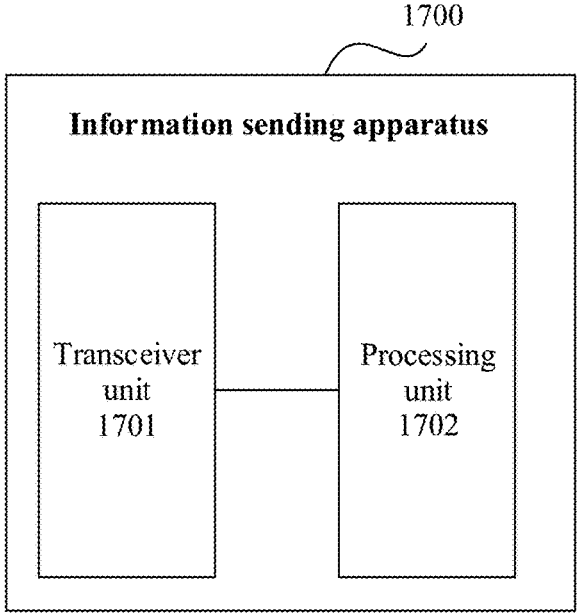
FIG. 17 is a schematic diagram of a structure of an information sending apparatus according to an embodiment of this application.

FIG. 17 is a schematic diagram of a structure of an information sending apparatus 1700 according to an embodiment of this application. The information sending apparatus 1700 may be a terminal device or a chip in the terminal device. The information sending apparatus 1700 may include a transceiver unit 1701 and a processing unit 1702. Detailed descriptions of each module are as follows.

The transceiver unit 1701 is configured to receive first physical uplink control channel PUCCH configuration information and second PUCCH configuration information from a network device, where the first PUCCH configuration information corresponds to a first service, the second PUCCH configuration information corresponds to a second service, the first PUCCH configuration information indicates a granularity of a first time unit, the second PUCCH configuration information indicates a granularity of a second time unit, and the granularity of the first time unit is different from the granularity of the second time unit.

The processing unit 1702 is configured to determine first hybrid automatic repeat request HARQ information and second HARQ information, where the first HARQ information is feedback information of data of the first service, the second HARQ information is feedback information of data of the second service, and a priority of the first HARQ information is the same as a priority of the second HARQ information.

The transceiver unit 1701 is configured to: when the first time unit overlaps the second time unit, send one of the first HARQ information and the second HARQ information to the network device, and discard the other one; or when the first time unit overlaps the second time unit, concatenate the first HARQ information and the second HARQ information, and send, to the network device, HARQ information that is obtained through concatenation and that includes the first HARQ information and the second HARQ information, where the first service is one of unicast and multicast, and the second service is the other one of unicast and multicast.

In a possible implementation, the transceiver unit 1701 is configured to: when the first time unit overlaps the second time unit, send the first HARQ information to the network device in the first time unit, and discard the second HARQ information; or when the first time unit overlaps the second time unit, send the second HARQ information to the network device in the second time unit, and discard the first HARQ information.

In a possible implementation, the transceiver unit 1701 is configured to: when the first time unit overlaps at least two second time units, and each of the second time units corresponds to one piece of second HARQ information, send the first HARQ information to the network device, and discard the at least two pieces of second HARQ information; or the transceiver unit 1701 is configured to: when the first time unit overlaps at least two second time units, and each of the second time units corresponds to one piece of second HARQ information, send at least one of the at least two pieces of second HARQ information to the network device, and discard the first HARQ information.

In a possible implementation, the transceiver unit 1701 is configured to: when the first time unit overlaps at least two second time units, send, to the network device in the first time unit or the second time unit, the HARQ information that is obtained through concatenation and that includes the first HARQ information and the second HARQ information.

In a possible implementation, if the first time unit overlaps at least two second time units, and each of the second time units corresponds to one piece of second HARQ information, the transceiver unit 1701 is configured to: concatenate the first HARQ information and at least one piece of second HARQ information.

In a possible implementation, the transceiver unit 1701 is configured to send, to the network device in the first time unit, HARQ information that is obtained through concatenation and that includes the first HARQ information and the at least one piece of second HARQ information.

In a possible implementation, the transceiver unit 1701 is configured to send, to the network device in a second time unit corresponding to any piece of concatenated second HARQ information, HARQ information that is obtained through concatenation and that includes the first HARQ information and the at least one piece of second HARQ information.

In a possible implementation, the first PUCCH configuration information includes the first PUCCH resource, the second PUCCH configuration information includes the second PUCCH resource, the first time unit includes the first PUCCH resource, and the second time unit includes the second PUCCH resource; and that the first time unit overlaps the second time unit is that the first PUCCH resource overlaps the second PUCCH resource.

It should be noted that, for implementations and advantageous effects of the units, refer to corresponding descriptions in the method embodiment shown in FIG. 5.

Figure 18:
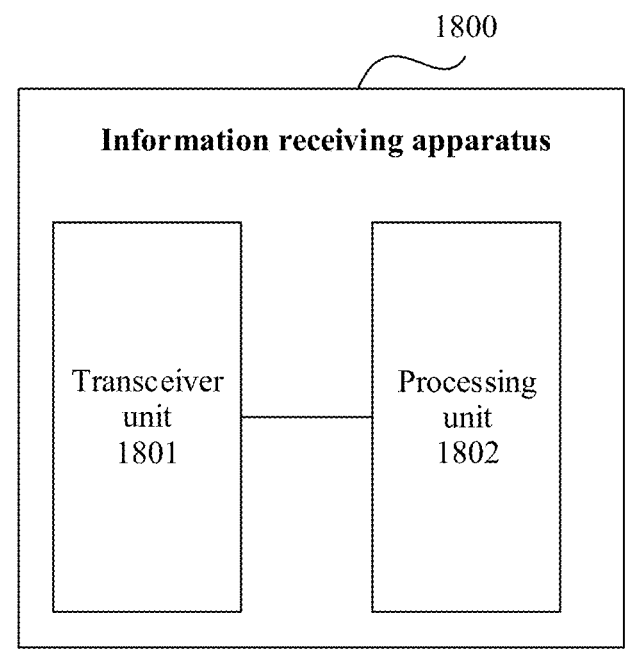
FIG. 18 is a schematic diagram of a structure of an information receiving apparatus according to an embodiment of this application.

FIG. 18 is a schematic diagram of a structure of an information receiving apparatus 1800 according to an embodiment of this application. The information receiving apparatus 1800 may be a network device or a chip in a network device. The information receiving apparatus 1800 may include a transceiver unit 1801 and a processing unit 1802. Detailed descriptions of each module are as follows.

The processing unit 1802 is configured to send first physical uplink control channel PUCCH configuration information and second PUCCH configuration information to a terminal device by using the transceiver unit 1801, where the first PUCCH configuration information corresponds to a first service, the second PUCCH configuration information corresponds to a second service, the first PUCCH configuration information indicates a granularity of a first time unit, the second PUCCH configuration information indicates a granularity of a second time unit, and the granularity of the first time unit is different from the granularity of the second time unit. First hybrid automatic repeat request HARQ information is feedback information of data of the first service, second HARQ information is feedback information of data of the second service, and a priority of the first HARQ information is the same as a priority of the second HARQ information. The first service is one of unicast and multicast, the second service is the other one of unicast and multicast, and the first time unit overlaps the second time unit. The transceiver unit 1801 is configured to receive one of the first hybrid automatic repeat request HARQ information and second HARQ information from the terminal device, or the transceiver unit 1801 is configured to receive, from the terminal device, HARQ information that is obtained through concatenation and that includes the first HARQ information and the second HARQ information.

In a possible implementation, the transceiver unit 1801 is configured to receive the first HARQ information from the terminal device in the first time unit, or the transceiver unit 1801 is configured to receive the second HARQ information from the terminal device in the second time unit.

In a possible implementation, if the first time unit overlaps at least two second time units, and each of the second time units corresponds to one piece of second HARQ information, the transceiver unit 1801 is configured to receive the first HARQ information from the terminal device, or the transceiver unit 1801 is configured to receive at least one of the at least two pieces of second HARQ information from the terminal device.

In a possible implementation, the transceiver unit 1801 is configured to receive, from the terminal device in the first time unit or the second time unit, the HARQ information that is obtained through concatenation and that includes the first HARQ information and the second HARQ information.

In a possible implementation, if the first time unit overlaps at least two second time units, and each of the second time units corresponds to one piece of second HARQ information, the first HARQ information is concatenated with at least one piece of second HARQ information.

In a possible implementation, the transceiver unit 1801 is configured to receive, from the terminal device in the first time unit, HARQ information that is obtained through concatenation and that includes the first HARQ information and the at least one piece of second HARQ information.

In a possible implementation, the transceiver unit 1801 is configured to receive, from the terminal device in a second time unit corresponding to any piece of concatenated second HARQ information, HARQ information that is obtained through concatenation and that includes the first HARQ information and the at least one piece of second HARQ information.

In a possible implementation, the first PUCCH configuration information includes the first PUCCH resource, the second PUCCH configuration information includes the second PUCCH resource, the first time unit includes the first PUCCH resource, and the second time unit includes the second PUCCH resource; and that the first time unit overlaps the second time unit is that the first PUCCH resource overlaps the second PUCCH resource.

It should be noted that, for implementations and advantageous effects of the units, refer to corresponding descriptions in the method embodiment shown in FIG. 5.

FIG. 17 is a schematic diagram of a structure of an information sending apparatus 1700 according to an embodiment of this application. The information sending apparatus 1700 may be a terminal device or a chip in the terminal device. The information sending apparatus 1700 may include a transceiver unit 1701 and a processing unit 1702. Detailed descriptions of each module are as follows.

The transceiver unit 1701 is configured to receive first physical uplink control channel PUCCH configuration information and second PUCCH configuration information from a network device, where the first PUCCH configuration information corresponds to a first service, the second PUCCH configuration information corresponds to a second service, the first PUCCH configuration information indicates a granularity of a first time unit, and the second PUCCH configuration information indicates a granularity of a second time unit.

The processing unit 1702 is configured to determine first hybrid automatic repeat request HARQ information and second HARQ information, where the first HARQ information is feedback information of unicast data, the second HARQ information is feedback information of multicast data, and a priority of the first HARQ information is the same as a priority of the second HARQ information.

If the apparatus does not expect the granularity of the first time unit to be different from the granularity of the second time unit, the granularity of the first time unit indicated by the first PUCCH configuration information is the same as the granularity of the second time unit indicated by the second PUCCH configuration information; and/or if the granularity of the first time unit is different from the granularity of the second time unit, the network device is not expected to indicate the terminal device to feed back the first HARQ information and the second HARQ information in the first time unit and the second time unit that overlap in time domain; or if the granularity of the first time unit is different from the granularity of the second time unit, the first time unit does not overlap the second time unit. The transceiver unit 1701 is configured to send the first HARQ information and/or the second HARQ information to the network device, where the first service is one of unicast and multicast, and the second service is the other one of unicast and multicast.

In a possible implementation, the transceiver unit 1701 is configured to: send the first HARQ information to the network device in the first time unit, and/or send the second HARQ information to the network device in the second time unit.

In another possible implementation, the granularity of the first time unit and the granularity of the second time unit are respectively a slot and a subslot.

It should be noted that, for implementations and advantageous effects of the units, refer to corresponding descriptions in the method embodiment shown in FIG. 16.

FIG. 18 is a schematic diagram of a structure of an information receiving apparatus 1800 according to an embodiment of this application. The information receiving apparatus 1800 may be a network device or a chip in a network device. The information receiving apparatus 1800 may include a transceiver unit 1801 and a processing unit 1802. Detailed descriptions of each module are as follows.

The processing unit 1802 is configured to send first physical uplink control channel PUCCH configuration information and second PUCCH configuration information to a terminal device by using the transceiver unit 1801, where the first PUCCH configuration information corresponds to a first service, the second PUCCH configuration information corresponds to a second service, the first PUCCH configuration information indicates a granularity of a first time unit, and the second PUCCH configuration information indicates a granularity of a second time unit. First hybrid automatic repeat request HARQ information is feedback information of data of the first service, second HARQ information is feedback information of data of the second service, and a priority of the first HARQ information is the same as a priority of the second HARQ information; and the first service is one of unicast and multicast, and the second service is the other one of unicast and multicast. If the terminal device does not expect the granularity of the first time unit to be different from the granularity of the second time unit, the granularity of the first time unit indicated by the first PUCCH configuration information is the same as the granularity of the second time unit indicated by the second PUCCH configuration information; and/or if the granularity of the first time unit is different from the granularity of the second time unit, the terminal device is not indicated to feed back the first HARQ information and the second HARQ information in the first time unit and the second time unit that overlap in time domain; or if the granularity of the first time unit is different from the granularity of the second time unit, the first time unit does not overlap the second time unit.

The transceiver unit 1801 is configured to receive the first HARQ information and/or the second HARQ information from the terminal device.

In a possible implementation, the transceiver unit 1801 is configured to: receive the first HARQ information from the terminal device in the first time unit, and/or receive the second HARQ information from the terminal device in the second time unit.

In another possible implementation, the granularity of the first time unit and the granularity of the second time unit are respectively a slot and a subslot.

It should be noted that, for implementations and advantageous effects of the units, refer to corresponding descriptions in the method embodiment shown in FIG. 16.

Figure 19:
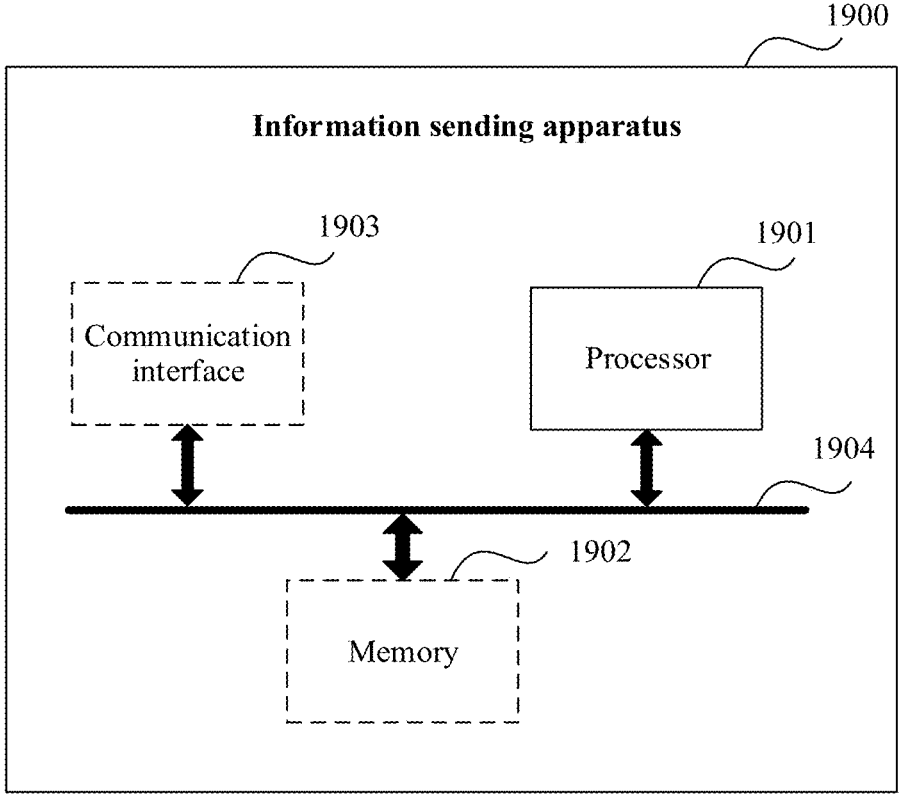
FIG. 19 is a schematic diagram of a structure of an information sending apparatus according to an embodiment of this application.

FIG. 19 shows an information sending apparatus 1900 according to an embodiment of this application. The information sending apparatus 1900 may be a terminal device or a chip in the terminal device. The information sending apparatus 1900 includes at least one processor 1901, and optionally, further includes a communication interface 1903 and a memory 1902. The processor 1901, the memory 1902, and the communication interface 1903 are connected to each other through a bus 1904.

The memory 1902 includes but is not limited to a random access memory (random access memory, RAM), a read-only memory (read-only memory, ROM), an erasable programmable read-only memory (erasable programmable read-only memory, EPROM), or a compact disc read-only memory (compact disc read-only memory, CD-ROM). The memory 1902 is configured to store related computer programs or instructions and related data. The communication interface 1903 is configured to receive and send data.

The processor 1901 may be one or more central processing units (central processing units, CPUs). When the processor 2801 is one CPU, the CPU may be a single-core CPU, or may be a multi-core CPU.

The processor 1901 in the apparatus 1900 is configured to read the computer programs or instructions stored in the memory 1902, to implement a function of the processing unit 1702, and the communication interface 1903 is configured to implement a function of the transceiver unit 1701.

Figure 20:
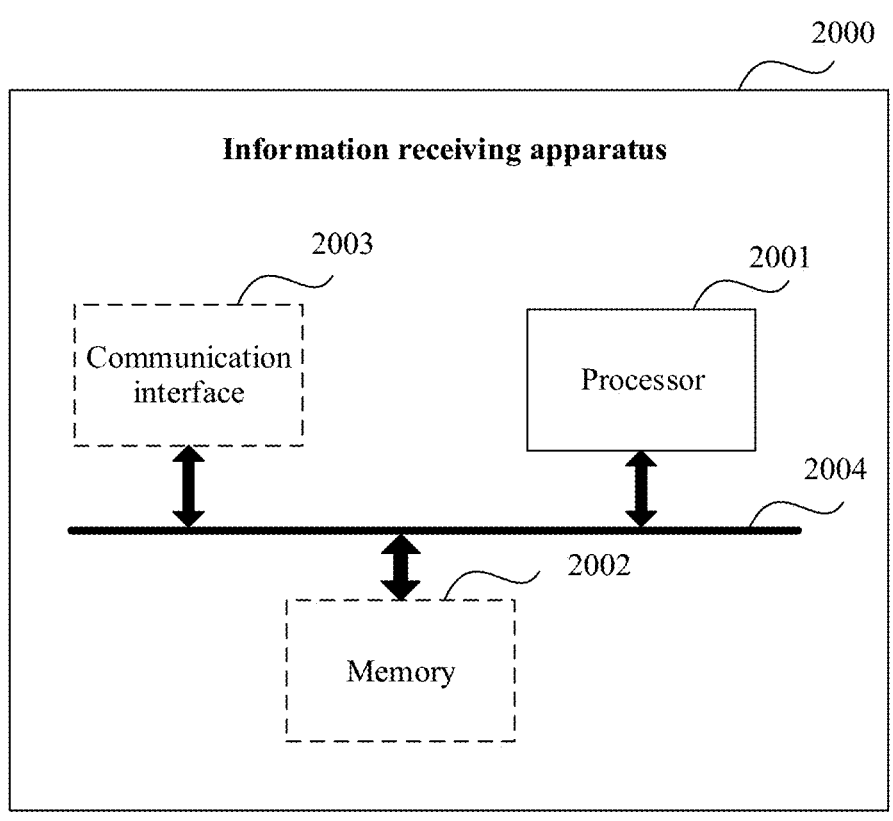
FIG. 20 is a schematic diagram of a structure of an information receiving apparatus according to an embodiment of this application.

FIG. 20 shows an information receiving apparatus 2000 according to an embodiment of this application. The information sending apparatus 2000 may be a network device or a chip in the network device. The information sending apparatus 2000 includes at least one processor 2001, and optionally, further includes a communication interface 2003 and a memory 2002. The processor 2001, the memory 2002, and the communication interface 2003 are connected to each other through a bus 2004.

The memory 2002 includes but is not limited to a random access memory (random access memory, RAM), a read-only memory (read-only memory, ROM), an erasable programmable read-only memory (erasable programmable read-only memory, EPROM), or a compact disc read-only memory (compact disc read-only memory, CD-ROM). The memory 2002 is configured to store related computer programs or instructions and related data. The communication interface 2003 is configured to receive and send data.

The processor 2001 may be one or more central processing units (central processing units, CPUs). When the processor 2801 is one CPU, the CPU may be a single-core CPU, or may be a multi-core CPU.

The processor 2001 in the apparatus 2000 is configured to read the computer programs or instructions stored in the memory 2002, to implement a function of the processing unit 1802, and the communication interface 2003 is configured to implement a function of the transceiver unit 1801.

It may be understood that the processor in embodiments of this application may be a central processing unit (Central Processing Unit, CPU), may be another general-purpose processor, a digital signal processor (Digital Signal Processor, DSP), an application-specific integrated circuit (Application-Specific Integrated Circuit, ASIC), a field programmable gate array (Field Programmable Gate Array, FPGA), another programmable logic device, a transistor logic device, a hardware component, or any combination thereof. The general purpose processor may be a microprocessor or any regular processor or the like.

The method steps in embodiments of this application may be implemented in a hardware manner or may be implemented in a manner of executing a software instruction by a processor. The software instructions may include a corresponding software module. The software module may be stored in a random access memory, a flash memory, a read-only memory, a programmable read-only memory, an erasable programmable read-only memory, an electrically erasable programmable read-only memory, a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a network device or a terminal device. Certainly, the processor and the storage medium may exist in the network device or the terminal device as discrete components.

All or some of the foregoing embodiments may be implemented by using software, hardware, firmware, or any combination thereof. When software is used to implement embodiments, all or some of embodiments may be implemented in a form of a computer program product. The computer program product includes one or more computer programs and instructions. When the computer programs or instructions are loaded and executed on a computer, all or some of the procedures or functions in embodiments of this application are executed. The computer may be a general-purpose computer, a dedicated computer, a computer network, a network device, user equipment, or another programmable apparatus. The computer programs or the instructions may be stored in a computer-readable storage medium, or may be transmitted from a computer-readable storage medium to another computer-readable storage medium. For example, the computer programs or the instructions may be transmitted from a web site, computer, server, or data center to another web site, computer, server, or data center in a wired or wireless manner. The computer-readable storage medium may be any usable medium that can be accessed by a computer, or a data storage device, such as a server or a data center, integrating one or more usable media. The usable medium may be a magnetic medium, for example, a floppy disk, a hard disk, or a magnetic tape; or may be an optical medium, for example, a digital video disc; or may be a semiconductor medium, for example, a solid state disk.

In embodiments of this application, unless otherwise stated or there is a logical conflict, terms and/or descriptions between different embodiments are consistent and may be mutually referenced, and technical features in different embodiments may be combined based on an internal logical relationship thereof, to form a new embodiment.

In this application, at least one means one or more, and a plurality of means two or more. The term "and/or" describes an association relationship between associated objects and indicates that three relationships may exist. For example, A and/or B may indicate the following three cases: Only A exists, both A and B exist, and only B exists. A and B each may be singular or plural. In the text descriptions of this application, the character "/" indicates an "or" relationship between the associated objects. In a formula in this application, the character "/" indicates a "division" relationship between the associated objects.

It may be understood that numerical symbols involved in embodiments of this application are differentiated merely for ease of description, but are not used to limit the scope of embodiments of this application. Sequence numbers of the foregoing processes do not mean execution sequences. The execution sequences of the processes should be determined based on functions and internal logic of the processes.

What is claimed is:

1. A method, comprising:
receiving first physical uplink control channel (PUCCH) configuration information and second PUCCH configuration information from a network device, wherein:
  the first PUCCH configuration information corresponds to a first service,
  the second PUCCH configuration information corresponds to a second service,
  the first PUCCH configuration information indicates a granularity of a first time unit, and
  the second PUCCH configuration information indicates a granularity of a second time unit;
determining first hybrid automatic repeat request (HARQ) information and second HARQ information, wherein:
  the first HARQ information is feedback information of data of the first service,
  the second HARQ information is feedback information of data of the second service, and
  a priority of the first HARQ information is the same as a priority of the second HARQ information; and
in response to determining that the granularity of the first time unit is different from the granularity of the second time unit,
sending the first HARQ information in the first time unit and the second HARQ information in the second time unit to the network device, wherein:
  the first time unit and the second time unit do not overlap in time domain,
  the first service is one of a unicast service and a multicast service, and
  the second service is the other one of the unicast service and the multicast service.

2. The method according to claim 1, further comprising:
determining the granularity of the first time unit indicated by the first PUCCH configuration information;
determining the granularity of the second time unit indicated by the second PUCCH configuration information; and determining that the granularity of the first time unit is different from the granularity of the second time unit.

3. The method according to claim 1, wherein determining that the granularity of the first time unit is different from the granularity of the second time unit comprises determining the granularity of the first time unit is a subslot and determining the granularity of the second time unit is a slot.

4. The method according to claim 3, wherein:
determining the granularity of the first time unit is a subslot comprises:
  determining that a subslot length field is configured in the first PUCCH configuration information; and
  in response to determining that the subslot length field is configured in the first PUCCH configuration information, determining the granularity of the first time unit is a subslot; and
determining the granularity of the second time unit is a slot comprises:
  determining that the subslot length field is not configured in the second PUCCH configuration information; and
  in response to determining that the subslot length field is not configured in the second PUCCH configuration information, determining the granularity of the second time unit is a slot.

5. The method according to claim 4, wherein the subslot length field comprises a subslotLengthForPUCCH-r16 field.

6. The method according to claim 4, wherein the determining that a subslotLengthForPUCCH-r16 field is not configured in the second PUCCH configuration information; and
in response to determining that the subslotLengthForPUCCH-r16 field is not configured in the second PUCCH configuration information, determining the granularity of the second time unit to be a slot; and
determining that the granularity of the first time unit is different from the granularity of the second time unit.

7. A method, comprising:
sending first physical uplink control channel (PUCCH) configuration information and second PUCCH configuration information to a terminal device, wherein:
  the first PUCCH configuration information corresponds to a first service,
  the second PUCCH configuration information corresponds to a second service,
  the first PUCCH configuration information indicates a granularity of a first time unit,
  the second PUCCH configuration information indicates a granularity of a second time unit, and
  the granularity of the first time unit is different from the granularity of the second time unit; and
receiving first hybrid automatic repeat request (HARQ) information and second HARQ information from the terminal device, wherein:
  the first time unit and the second time unit do not overlap in time domain,
  the first HARQ information is feedback information of data of the first service,
  the second HARQ information is feedback information of data of the second service,
  a priority of the first HARQ information is the same as a priority of the second HARQ information; and
  the first service is one of a unicast service and a multicast service, and the second service is the other one of the unicast service and the multicast service.

8. The method according to claim 7, wherein the first PUCCH configuration information indicates the granularity of a first time unit to be a subslot and the second PUCCH configuration information indicates the granularity of the second time unit to be a slot.

9. The method according to claim 7, further comprising: configuring the granularity of the first time unit to be a subslot by configuring a subslot length field in the first PUCCH configuration information.

10. The method according to claim 9, wherein the subslot length field comprises a subslotLengthForPUCCH-r16 field.

11. The method according to claim 8, wherein:

the first PUCCH configuration information indicates the granularity of a first time unit to be a subslot comprises a subslot length field in the first PUCCH configuration information is configured, and the second PUCCH configuration information indicates the granularity of the second time unit to be a slot comprises a subslot length field in the second PUCCH configuration information is not configured.

12. An apparatus, comprising:

one or more processors; and one or more memories coupled to the one or more processors and storing programming instructions for execution by the one or more processors to cause the apparatus to perform a method operations comprising:

receiving first physical uplink control channel (PUCCH) configuration information and second PUCCH configuration information from a network device, wherein:

the first PUCCH configuration information corresponds to a first service, the second PUCCH configuration information corresponds to a second service, the first PUCCH configuration information indicates a granularity of a first time unit, and the second PUCCH configuration information indicates a granularity of a second time unit;

determining first hybrid automatic repeat request (HARQ) information and second HARQ information, wherein:

the first HARQ information is feedback information of data of the first service, the second HARQ information is feedback information of data of the second service, and a priority of the first HARQ information is the same as a priority of the second HARQ information; and in response to determining that the granularity of the first time unit is different from the granularity of the second time unit, sending the first HARQ information in the first time unit and the second HARQ information in the second time unit to the network device, wherein:

the first time unit and the second time unit do not overlap in time domain, and the first service is one of a unicast service and a multicast service, and the second service is the other one of the unicast service and the multicast service.

13. The apparatus according to claim 12, wherein the operations further comprise:

determining the granularity of the first time unit indicated by the first PUCCH configuration information;

determining the granularity of the second time unit indicated by the second PUCCH configuration information; and determining that the granularity of the first time unit is different from the granularity of the second time unit.

14. The apparatus according to claim 12, wherein determining that the granularity of the first time unit is different from the granularity of the second time unit comprises determining the granularity of the first time unit is a subslot and determining the granularity of the second time unit is a slot.

15. The apparatus according to claim 14, wherein:

determining the granularity of the first time unit is a subslot comprises:

determining that a subslot length field is configured in the first PUCCH configuration information; and in response to determining that the subslot length field is configured in the first PUCCH configuration information, determining the granularity of the first time unit is a subslot; and determining the granularity of the second time unit is a slot comprises:

determining that the subslot length field is not configured in the second PUCCH configuration information; and in response to determining that the subslot length field is not configured in the second PUCCH configuration information, determining the granularity of the second time unit is a slot.

16. An apparatus, comprising:

one or more processors; and one or more memories coupled to the one or more processors and storing programming instructions for execution by the one or more processors to cause the apparatus to perform a method operations comprising:

sending first physical uplink control channel (PUCCH) configuration information and second PUCCH configuration information to a terminal device, wherein:

the first PUCCH configuration information corresponds to a first service, the second PUCCH configuration information corresponds to a second service, the first PUCCH configuration information indicates a granularity of a first time unit, the second PUCCH configuration information indicates a granularity of a second time unit, and the granularity of the first time unit is different from the granularity of the second time unit; and receiving first hybrid automatic repeat request (HARQ) information in the first time unit and second HARQ information in the second time unit, wherein:

the first time unit and the second time unit do not overlap in time domain, the first HARQ information is feedback information of data of the first service, the second HARQ information is feedback information of data of the second service, a priority of the first HARQ information is the same as a priority of the second HARQ information, and the first service is one of a unicast service and a multicast service, and the second service is the other one of the unicast service and the multicast service.

17. The apparatus according to claim 16, wherein the first PUCCH configuration information indicates the granularity of a first time unit to be a subslot and the second PUCCH configuration information indicates the granularity of the second time unit to be a slot.

18. The apparatus according to claim 16, wherein the first PUCCH configuration information indicates the granularity of a first time unit to be a subslot comprises:

a subslot length field in the first PUCCH configuration information is configured.

19. The apparatus according to claim 18, wherein the subslot length field comprises a subslotLengthForPUCCH-r16 field.

20. The apparatus according to claim 17, wherein the second PUCCH configuration information indicates the granularity of the second time unit to be a slot comprises:

a subslot length field in the second PUCCH configuration information is not configured.

\* \* \* \* \*